(12) United States Patent
Goebel

(10) Patent No.: US 12,088,012 B2
(45) Date of Patent: Sep. 10, 2024

(54) APPARATUS RADIATING AND RECEIVING MICROWAVES WITH PHYSICALLY PRESET RADIATION PATTERN, AND RADAR APPARATUS COMPRISING SUCH AN APPARATUS

(71) Applicant: Uhland Goebel, Senden (DE)

(72) Inventor: Uhland Goebel, Senden (DE)

( * ) Notice: Subject to any disclaimer, the term of this patent is extended or adjusted under 35 U.S.C. 154(b) by 387 days.

(21) Appl. No.: 17/607,310

(22) PCT Filed: Apr. 24, 2020

(86) PCT No.: PCT/EP2020/061526
§ 371 (c)(1),
(2) Date: Oct. 28, 2021

(87) PCT Pub. No.: WO2020/221671
PCT Pub. Date: Nov. 5, 2020

(65) Prior Publication Data
US 2022/0209423 A1 Jun. 30, 2022

(30) Foreign Application Priority Data

Apr. 29, 2019 (EP) ..................................... 19171655

(51) Int. Cl.
*H01Q 21/06* (2006.01)
*G01S 7/282* (2006.01)
(Continued)

(52) U.S. Cl.
CPC ........... *H01Q 21/064* (2013.01); *G01S 7/282* (2013.01); *G01S 7/285* (2013.01); *G01S 13/931* (2013.01);
(Continued)

(58) Field of Classification Search
CPC .. H01Q 21/064; H01Q 13/18; H01Q 21/0037; G01S 7/282; G01S 7/285; G01S 13/931; H01P 5/082
See application file for complete search history.

(56) References Cited

U.S. PATENT DOCUMENTS

| | | | |
|---|---|---|---|
| 3,832,716 A | 8/1974 | Plunk et al. | |
| 2016/0036131 A1* | 2/2016 | Kim | ...................... H01Q 1/3233 343/771 |
| 2018/0358709 A1* | 12/2018 | You | ....................... H01Q 21/064 |

FOREIGN PATENT DOCUMENTS

CN 106711616 A 5/2017

OTHER PUBLICATIONS

International Search Report and Written Opinion for Application No. PCT/EP2020/061526 dated Jul. 9, 2020 (10 pages).

* cited by examiner

*Primary Examiner* — Peter M Bythrow
*Assistant Examiner* — Nazra Nur Waheed
(74) *Attorney, Agent, or Firm* — Michael Best & Friedrich LLP

(57) ABSTRACT

Apparatus for radiating and/or receiving microwaves and comprising one radiator group with u building blocks with u being an even number, wherein
said radiator group has a sandwich-layout comprising a structured layer with q integrated cavities on one side face, with q being an even number, and a structured metal layer covering at least part of said one side face,
said u building blocks are structurally identical,
said metal layer is structured so that each of said u building blocks comprises a suspended patch-shaped element, which is cavity-backed by one of said q integrated cavities,
the shape and size of said patch-shaped elements is defined by boundary slots of said metal layer,
(Continued)

said at least one radiator group has a common, central feed point as interface for a hollow waveguide, and wherein said apparatus comprises a hollow waveguide or a waveguide flange being connected to said central feed point.

13 Claims, 13 Drawing Sheets

(51) Int. Cl.
    *G01S 7/285*    (2006.01)
    *G01S 13/931*   (2020.01)
    *H01P 5/08*     (2006.01)
    *H01Q 13/18*    (2006.01)
    *H01Q 21/00*    (2006.01)
(52) U.S. Cl.
    CPC ............. *H01P 5/082* (2013.01); *H01Q 13/18* (2013.01); *H01Q 21/0037* (2013.01)

APPARATUS RADIATING AND RECEIVING MICROWAVES WITH PHYSICALLY PRESET RADIATION PATTERN, AND RADAR APPARATUS COMPRISING SUCH AN APPARATUS

FIELD OF THE INVENTION

The present invention concerns an apparatus for radiating and receiving electromagnetic waves with a non-trivial radiation pattern, which is preset by design of its physical arrangement. It further concerns a radar apparatus which comprises at least one such apparatus.

BACKGROUND

Waveguides are commonly employed media for the propagation of electromagnetic microwaves. Waveguides typically are hollow conductive conduits which have a rectangular or circular cross section designed to propagate microwaves with a minimum of loss. Waveguides might include ridged structures within the waveguide conduit to change the propagation characteristics of the waveguides and to adapt them for particular applications. Single-ridge and double-ridge waveguides are widely used.

Antenna elements are used in order to radiate and/or receive microwaves. In many applications, horn antennas (e.g. a rectangular waveguide horn) are used to emit and direct microwaves into a well-defined beam propagation direction, with a well-defined radiation pattern. A horn antenna comprises a flaring metal waveguide which is shaped like a horn. Such a horn antenna has a 3-dimensional shape and thus occupies a certain installation space.

Relatively short horn antennas provide a limited gain (e.g. between 8 and 13 dBi) and relatively wide radiation patterns in the cardinal cut planes. Single horn antennas or linear arrays of such horns are candidates for sparsely populated flat array antennas, which are of special interest for modern electronic beam forming radar sensors. On one hand, horns provide for a useful spatial (angular) pre-filtering, which allows for enlarged inter-element spacing, while reducing grating lobes (by partially suppressing radiation into unwanted secondary directions of steered beam radiation). On the other hand, the aperture field distribution of waveguide horns is very sensitive to symmetry-disturbing near-by metallic objects like e.g. other radiator structures, since higher order waveguide modes can propagate up to certain depth into the flared waveguide. As a result, near-field coupling influences and distorts the radiation pattern of the array-constituent elementary horn radiator significantly.

SFPA (Serially-Fed Patch Array) antennas are in wide use for current MIMO—(Multiple Input, Multiple Output) and Virtual Array radar sensors of small to medium channel count (e.g. having 3 transmitting, and 4 to 8 receiving antennas). They are based on microstrip transmission lines and conveniently produced in standard PCB (printed circuit board) (photolithographic) fabrication process. Typically, the electronic beam steering function of such sensors is mainly dedicated to horizontal (azimuth) plane in front of the vehicle or in the industrial sensor's viewing range, extended by a vertical DOA (Direction of Arrival) estimation by the use of vertically off-set antenna sub-arrays, which provide for a phase offset dependent on the vertical angle of arrival. Due to the typically narrow elevation angle range of interest, SFPAs are employed (e.g. with 6 . . . 12 daisy-chained patches) for providing vertical beam confinement in order to increase the system gain. Disadvantages of SFPAs are the limited matching bandwidth and (even more of an issue with increasing patch numbers) the frequency-dependence of the main lobe direction (unintended "frequency scanning"). SFPAs and their microstrip feed lines exhibit a typical loss of 2 . . . 3 dB per inch or 0.08 to 0.12 dB per millimeter line length. In the vertical (E-plane) cut, side lobes of the radiation pattern can be reduced by varying the power level, radiated by each patch, by varying the patch width (the wider, the more of the traveling wave power is extracted and radiated off locally).

While SFPAs used in automotive radar sensors radiate and receive vertically linear polarized waves (aligned with the respective array axis), a comb-line antenna is obtained by ca. half wavelength long open stub lines, connected to and arrayed with alternating orientation along a central microstrip feed line. The resulting radiation is transversely, i.e. horizontally, polarized in the typical automotive radar application, when stubs are oriented at 90° with respect to the central feed line (array axis). The polarization state can be changed by using other stub orientation angles, e.g. +45° or −45°, which is widely used in automotive radar sensors designed for the Japanese market. By adjusting the width of the stub lines, side lobe reduction can be achieved to some extent. A simple variant of such comb-line antenna is the leaky wave zig-zag antenna, which consists of inclined segments of microstrip line, each having a length of half wavelength between left-right alternating bends. Both comb-line and zig-zag antenna are affected by the same limitations as the SFPA-antenna (limited bandwidth, relatively high loss and frequency-scanning of main beam), while the latter is the most easy to fabricate, but has the most limited degree of design freedom.

An alternative to patch- or stub-like microstripline-based antennas are slot arrays. Here, a certain area of an electrically conducting plane, which extends beyond the intended overall radiating aperture, is locally interrupted by slots, which can assume different shapes but are typically tuned to a resonance frequency close to the center of the desired frequency band of operation. By proper arrangement and coherent excitation, these slots can provide very similar transmit- and receive characteristics as compared to patch- or stub type radiators. A rule of thumb exists, whereby 2 slots arranged at the positions of the radiating edges of a patch can be used as a substitute. Slot arrays (without dielectric cover layer) are less prone to inter-radiator coupling, since there are no guided surface propagation modes, in contrast to the openly exposed substrate used with a microstrip patch array or comb-line antenna. Also, the closed electrically conductive plane can be exploited to shield the transmission lines of the feed network, avoiding unwanted stray radiation and impure wave polarization states. There are substrate integrated waveguide (SIW) based slot array antennas, which as such have a planar structure. These slot array antennas, however, have certain limitations as far as their bandwidth and radiation efficiency are concerned. Since the SIW is based on a dielectric substrate, e.g. a low-loss RF (radio frequency) substrate, there is a dielectric to air interface stretching out inside each open slot area. The electric field around the slot is to ca. 50% running through air, the other part is loaded by the substrate dielectric. This reduces the slot resonance frequency as compared to a slot, which is fully embedded in air. On the other hand, SIW height is typically kept small, e.g. limited by the thickness of the outermost PCB layer substrate (which is often only 5 or 10 mils thick, corresponding to 127 or 254 μm). The results is, that resonant, radiating slots directly embedded into a SIW need to be narrow and have a reduced length, as compared to an air-embedded slot. Thus, they provide less radiation efficiency and exhibit higher resonant Q-values, resulting in smaller usable bandwidth than their air-embedded counterparts. An advantage of SIW-based slot arrays, beyond the shielded feed network, is the possibility to shape the beam in a plane transversal to the feeding wave propagation direction. This is e.g. used to tailor the azimuthal radiation pattern to the desired shape e.g. by using a longitudinal slot pair of differing length (resonance frequency) for every elementary radiator. The different resonance frequencies result in different excitation phases with respect to the momentary phase angle of the wave traveling in the SIW. Thus, tilted beams are possible to realize, which might be useful for achieving a desired scene illumination, e.g. with side-looking radars.

Typically, a waveguide is coupled to the horn antenna in order to feed the antenna or in order to guide received microwaves towards a subsequent processing circuitry. In order to connect a planar antenna like SFPA, comb-line or zig-zag arrays to subsequent circuitry, a microstrip line is the preferred medium, eventually combined with a BALUN (balanced-unbalanced converter) like a rat-race coupler, which allows connecting balanced (push-pull) transmitter ports of monolithically integrated transceiver circuits to a microstrip signal route. Often, signal underpasses are required to escape the inner volume of shielding lids. In this case, SIW sections with transitions to microstrip are an advantageous solution. If the antenna is placed on the same side of the PCB as the active RF circuitry, SIW-based slot antennas can be readily connected to such signal underpasses. In the other case, a much more complicated signal connection from one side of the PCB to the opposite is necessary for every independent receive- and transmit channel, e.g. by a substrate-penetrating waveguide duct with metallized side walls. This method is merely effective and rendered impossible for high channel counts as required for future 2D-scanning radars.

Due to the different preferred chip package styles in use historically and dependent on the fractional market volume for certain types of radar sensors as well as the production technologies available and established at different radar manufacturer's, it is necessary to couple different types of media for the propagation of microwaves in hybrid systems. The general market trend is directed towards significantly increased angular resolution, both in azimuthal and elevation planes; in the same time, the cost must be reduced further and the front-side real estate available for any sensor on the car exterior is very limited, which asks for significant size reduction. Wafer-level packaging such as eWLB (expanded wafer level ball grid, e.g. with 0.4 mm or 0.5 mm pitch) offer high circuit/port density. This needs to be complimented with a multi-channel signal distribution network, which connects to large numbers of reduced-size, individually excited radiator elements. A typical example for upcoming channel counts is 16, 24 or 48 transmit channels and an equivalent number of receive channels, integrated into a compact 77 GHz radar sensor occupying less than 100 cm² radome front area.

It is important to be able to provide suitable, versatile transitions between a chip set and a signal distribution network on one end, and on the other end to a set of antennas. Waveguide, e.g. ridged waveguide conduits are a very advantageous option for signal distribution, because they offer very low loss and high inter-channel isolation. It is advisable to place transitions between short sections of planar transmission media, that comply with the small port pitch of the chip package, and the waveguides as close as possible to the chip periphery.

Typically, the design of hybrid systems is difficult due to the very different nature of the conventionally employed antenna elements (as outlined above) and waveguide conduits. The routing of the RF signal paths is one of the key issues if a densely packed, robust design of an RF-system is required.

SUMMARY

It is an objective within the scope of this document, to provide for radiator elements, which are exhibiting low loss, wide band matching and allow for adaptation to a range of angular radiation width requirements.

It is a further objective within the scope of this document, to achieve a simple, effective and tolerance-insensitive connection of such radiator elements to a waveguide-based signal distribution duct.

Another objective within the scope of this document is to provide medium range element gain, ideally accompanied by low side lobe levels in the vertical (elevation) plane, as to avoid excessive levels of near range road surface scattering and Doppler noise pickup into the receive channels.

Yet another objective is to achieve small inter-element interaction (parasitic signal coupling), both between members of the same sub-array as between different sub-arrays.

A further objective is to enable small enough lateral radiator spacing to allow for conventional wide-angle beam scanning without ambiguity/grating lobe generation (requiring down to $\lambda_0/2$ element placement), without compromising the operational bandwidth and single element radiation characteristics.

These objects are being solved by an apparatus in accordance with claim 1 and a radar apparatus in accordance with claim 11. Advantageous improvements can be derived from the dependent claims and the below description.

In accordance with at least some embodiments, an apparatus is provided which comprises at least one radiator group with u building blocks with u being an even number, wherein said radiator group has a sandwich-layout comprising a structured layer with q integrated cavities on one side face, with q being an integer number≥2, and a structured metal layer covering at least part of said one side face, said u building blocks are structurally identical, said metal layer is structured so that each of said u building blocks comprises a suspended patch-shaped element, which is cavity-backed by one of said q integrated cavities, the shape and size of said patch-shaped elements is defined by boundary slots of said metal layer, said at least one radiator group has a common, central feed point as interface for a hollow waveguide, and wherein said apparatus comprises a hollow waveguide or a waveguide flange being connected to said central feed point. This apparatus is specifically designed for radiating and/or receiving microwaves.

For enabling the lowest possible cost of antenna subsystem production and integration, the piece-part count of at least some embodiments are low, e.g. requiring only 1 metallized plastics part and 1 or 2 metal sheets for the whole antenna subsystem of a radar sensor.

The apparatus of at least some embodiments is providing a number of advantages, when used as purposefully arranged antenna building blocks in advanced radar sensors, e.g. for automotive and for industrial sensing applications.

The apparatus of at least some embodiments may be designed for use in radar applications in a frequency range between 20 GHz and 1 THz. The embodiments presented herein may be designed for use in a frequency range between 94 GHz and 120 GHz.

Advances in fabrication technology, like metallized plastics for 3D components and roll-to-roll metal foil processing (by etching, laser-cutting, galvanic plating e.t.c., and in CAD/CAE methods with full-wave analysis based design flows, open a number of new opportunities used herein. Specifically, metallized plastics piece part production allow high accuracy and reproducibility to the single micrometer tolerance range, as does precision etching and plating of metal foil (which is widely used for lead-frames in semiconductor packaging technology). These technologies are thus used in some of the embodiments presented herein.

A waveguide-based signal distribution layer is employed in some of the embodiments between active RF circuitry and antenna elements, since one can free up some of the printed circuit board area for electronic component placement, which was formerly occupied by planar radiating elements. This allows for a further increased product density and a higher integration level of at least some embodiments. This can e.g. be accomplished by compact transitions between SIW residing on the PCB surface and ridged waveguide, exiting in normal direction to the PCB surface. Then, signal distribution can be obtained within one or more stacked waveguide layers.

It is an advantage of at least some embodiments that it is possible to employ metal sheet, metallized plastics piece part or copper-clad dielectric substrate (e.g. structured by photolithography) to provide for the radiator function.

In accordance with at least some embodiments, an apparatus is provided which is based on a modular concept. Each apparatus comprises two or more than two building blocks so as to realize a radiator group.

The combination of two or more than two building blocks facilitates the construction of radiator groups while keeping a close eye on the beam shaping characteristics.

The embodiments proposed herein have a number of advantages as far as their system integration is concerned. The respective elements have a small footprint and can thus be used in connection with arrays which require a λo/2 grid size or spacing.

The embodiments proposed herein have the advantage that no 3-dimensional radiators—such as horns—are required.

Instead of using a simple patch-shaped antenna design, the embodiments presented herein comprise suspended patches situated above an associated cavity. Boundary slots are employed to define the cavity-backed, patch-shaped elements. The respective cavities provide for a well-controlled, purposefully adjusted excitation of the outer boundary slots.

At least some of the embodiments proposed herein comprise boundary slots which either have a U-shape or which at least comprise one U-shaped portion.

In at least some embodiments, the outer boundary slots have a slightly different length, shape or width, as compared to the inner boundary slots. This allows an adjustment of the excitation phase in conjunction with the inductive iris provided by constrictions situated underneath. This degree of freedom distinguishes the apparatus disclosed herein from conventional rectangular patch radiators (as e.g. used in SFPAs), which each form only one resonating element,
resulting in closely interrelated field amplitudes and phases (approximately) 180° at the opposed radiating edges.

The embodiments proposed herein comprise a central feed point which provides for a push-pull excitation of opposed radiator groups.

The embodiments proposed herein can be used in connection with arrays which have a grid size or spacing of 2 mm or less.

The embodiments proposed herein are well suited for use in beam steering antennas where a high antenna gain can be achieved with a 3λo/4 grid size or spacing in the static (not steered) cardinal plane.

At least some embodiments of the apparatus comprise a central waveguide feed for feeding the planar radiator groups.

It is an advantage of at least some embodiments of the apparatus that their planar configuration has a thickness of less than 1 mm.

It is an advantage of at least some embodiments of the apparatus that their directivity shows only a very low frequency dependency.

This summary is not exhaustive of the scope of the present aspects and embodiments. Thus, while certain aspects and embodiments have been presented and/or outlined in this summary, it should be understood that the present aspects and embodiments are not limited to the aspects and embodiments in this summary. Indeed, other aspects and embodiments, which may be similar to and/or different from, the aspects and embodiments presented in this summary, will be apparent from the description, illustrations and/or claims, which follow.

It should also be understood that any aspects and embodiments that are described in this summary and do not appear in the claims that follow are preserved for later presentation in this application or in one or more continuation patent applications.

BRIEF DESCRIPTION OF THE DRAWINGS

Other advantages and features will become apparent from the following detailed description, which are to be understood not to be limiting, are described in more detail below with reference to the drawings.

DETAILED DESCRIPTION

In connection with the present description, terms are used which also find use in relevant publications and patents. It is noted however, that the use of these terms shall merely serve a better comprehension. The inventive idea and the scope of the patent claims shall not be limited in their interpretation by the specific selection of the terms. The invention can be transferred without further ado to other systems of terminology and/or technical areas. In other technical areas, the terms are to be employed analogously.

For the purposes of the present description and claims, some of the essential elements or building blocks of an apparatus 100 are defined before details of various embodiments are being addressed.

All embodiments of the apparatus 100 comprise multiple building blocks or components which as such are identical from a structural point of view. These building blocks or components are herein referred to structurally identical building blocks. An even number u is used to define the number of structurally identical building blocks of an apparatus 100.

These building blocks, if combined as proposed herein, serve as radiator group 110. If several radiator groups 110 are combined, then these radiator groups are herein referred to as radiator arrays.

The design parameters of the building blocks and/or of the radiator groups 110 can be changed so as to alter the sensing area. Changing the design parameters, for example, makes it possible to find an appropriate tradeoff between the antenna gain and the angular coverage of a radiator group 110. It is possible to reduce side lobes while at the same time negative coupling effects between adjacent building blocks and/or adjacent radiator groups 110 can be minimized.

All embodiments of the apparatus 100 comprise a planar configuration where the wave-guiding elements/components 112, 113 have a thickness of less than 1.25 mm, in case of an embodiment designed for 77 GHz application. This planar configuration is oriented parallel to the x-y-plane of an x,y,z-coordinate system.

Figure 1A:
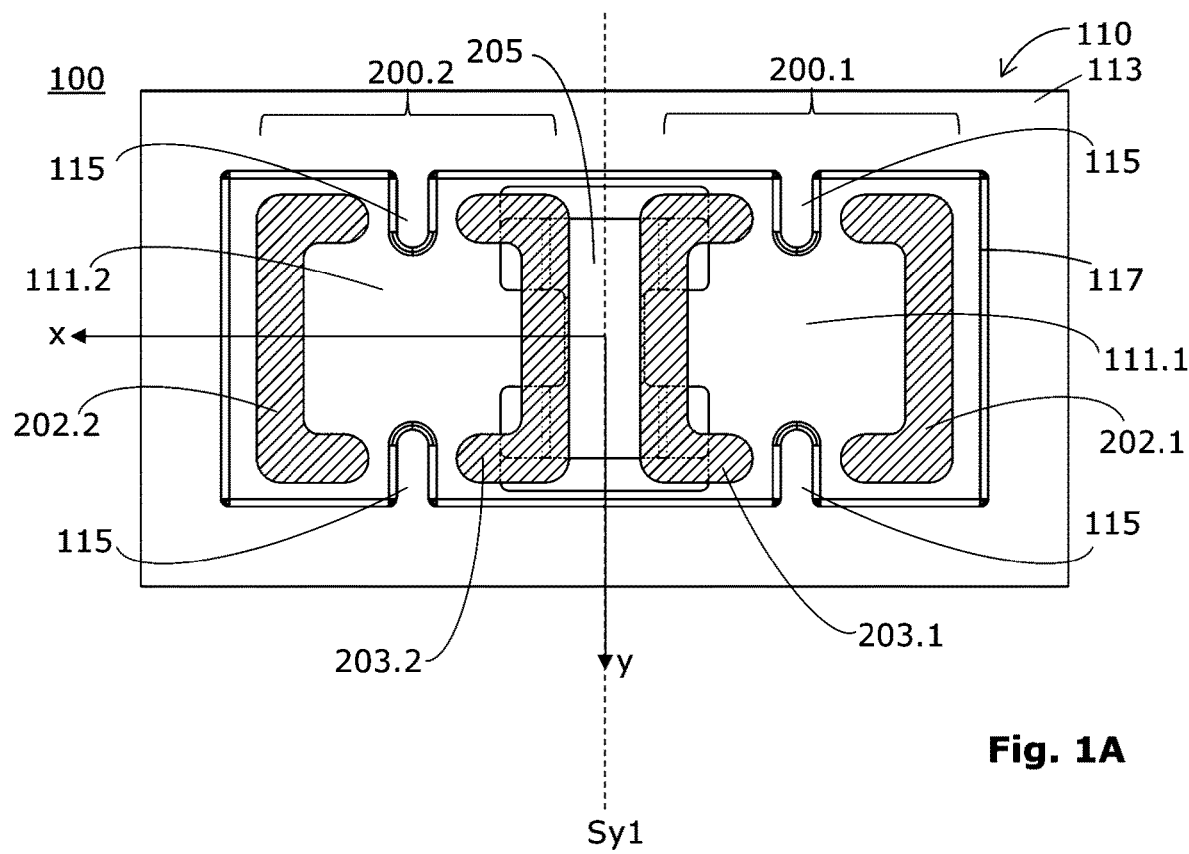
FIG. 1A schematically shows a top view of a first embodiment of an apparatus of the present disclosure which comprises a radiator group with two patch-shaped elements and four slots.
Figure 1B:
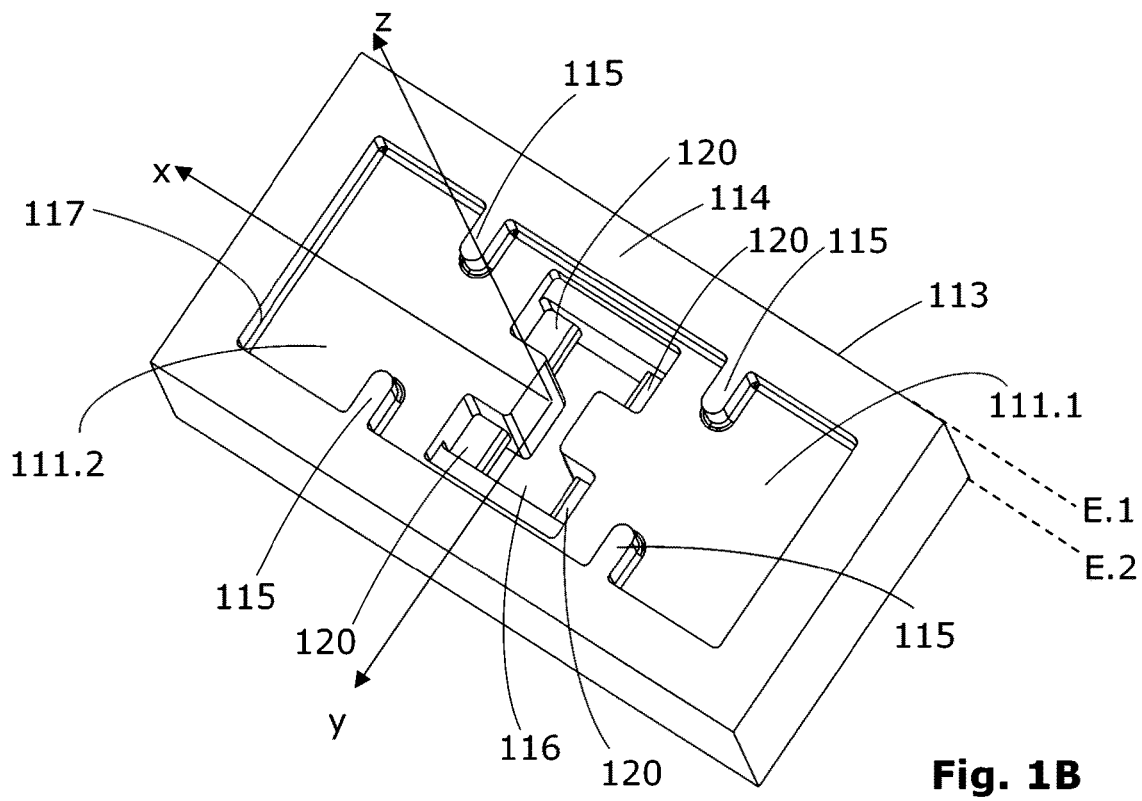
FIG. 1B schematically shows a perspective top view of the structured layer of the first embodiment of FIG. 1A.
Figure 1C:
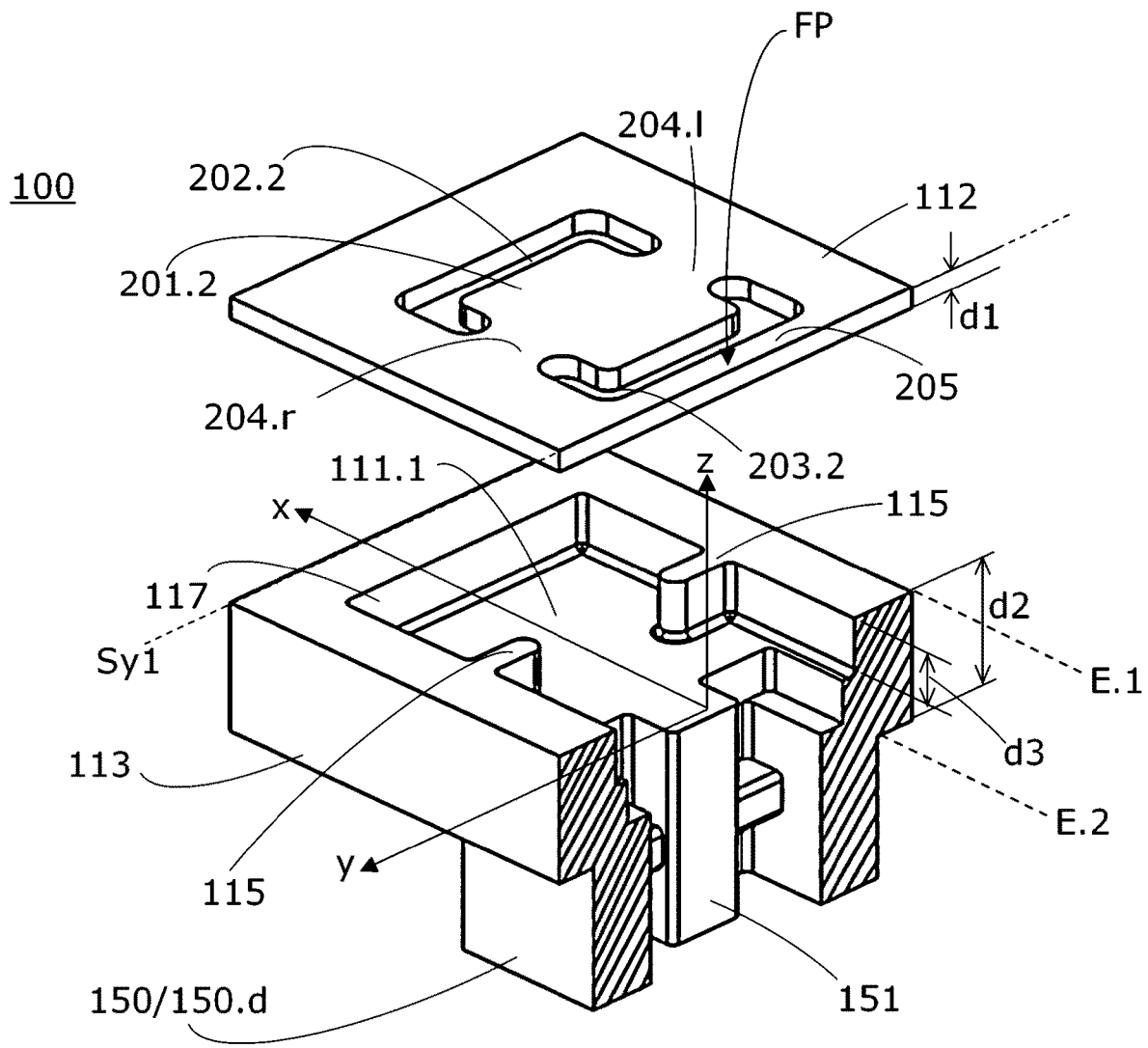
FIG. 1C schematically shows a perspective exploded sectional view of the structured metal layer, the structured layer, and the waveguide of the first embodiment of FIG. 1A.

At least some embodiments of the apparatus 100 comprise a structured metal layer 112, as for example illustrated in FIG. 1C. This structured metal layer 112 is part of the above-mentioned planar configuration.

In at least some embodiments, a metallization (e.g. a metal layer evaporated onto or deposited on a substrate or other carrier) serves as structured metal layer 112.

In at least some embodiments, a preprocessed metal plate or metal sheet serves as intermediate product for the actual production of the structured metal layer 112. The structured metal layer 112 might have a thickness in the range between 0.05 and 0.25 mm, for example.

In the following, items like patch-shaped elements 201.1, 201.2 e.t.c. are addressed by general running index i, i being an integer with $1 \leq i \leq n$, for example. The statement n=4 means, that there are 4 patch-shaped elements 201.1, 201.2, 201.3 and 201.4 in the respective embodiment.

All embodiments of the apparatus 100 comprise a structured metal layer 112 which is structured so as to define n=2, 4, 6 or more patch-shaped elements 201.i. In order to define n patch-shaped elements 201.i, boundary slots 202.i and 203.i are provided (with independent indexes i, which run from 1 to m, in the case of boundary slots 202.i and from 1 to k in case of boundary slots 203.i).

In at least some embodiments, the boundary slots 202.i and 203.i are cavity-backed slots.

The embodiment of FIGS. 1A-1D comprises a structured metal layer 112 which comprises n=2 patch-shaped elements 201.1, 201.2, and a total number of four boundary slots 202.1, 202.2, 203.1, and 203.2. One patch-shaped element 201.2 is visible in FIG. 1C.

In FIG. 1A, the structured metal layer 112 is omitted. Just size, shape and position of the boundary slots 202.1, 202.2, 203.1, and 203.2 are shown by means of hatched, transparent areas.

A distinction is made between outer boundary slots 202.1, 202.2 and inner boundary slots 203.1, 203.2. In the present embodiment, the patch-shaped elements 201.1, 201.2 have a rectangular basic form and each of the four boundary slots 202.1, 202.2, 203.1, and 203.2 have a "C"-shape. Like two parentheses or brackets, the two boundary slots 202.1, 203.1 enclose the patch-shaped element 201.1 (not shown), and the two boundary slots 202.2, 203.2 enclose the patch-shaped element 201.2 (cf. FIG. 1C). That is, the shape and size of the patch-shaped elements 201.i is defined by size, position, and shape of the boundary slots 202.i, 203.i of the structured metal layer 112.

In at least some embodiments, the outer boundary slots 202.i might have a slightly different length, shape or width, as compared to the inner boundary slots 203.i, for adjusting the excitation phase in conjunction with the inductive iris provided by the constrictions 115. This degree of freedom distinguishes the apparatus 100 of the present document from conventional rectangular patch radiators (as e.g. used in SFPAs), which each form only one resonating element, resulting in closely interrelated field amplitudes and phases (approximately 180°) at the opposed radiating edges.

A boundary slot 202.$i$, 203.$i$ is an (etched, milled, drilled, cut, laser cut, punched) opening which extends from an uppermost layer of the structured metal layer 112 to a lower most layer of the structured metal layer 112 so that a structure (e.g. a cavity 111.$i$ of the structured layer 113) underneath is partially exposed.

In at least some embodiments, the metal layer 112 is structured so that each of the patch-shaped elements 201.$i$ is suspended above a respective cavity 111.$i$. I.e., there are n patch-shaped elements 201.$i$ and n associated cavities 111.$i$.

FIG. 1A shows a top view of the respective structured layer 113, and FIG. 1B shows a perspective view of the structured layer 113. This structured layer 113 is situated underneath the structured metal layer 112 (see FIG. 1C) and the structured layer 113 comprises q cavities 111.$i$. In other words, each of the suspended patch-shaped elements 201.$i$ is cavity-backed by one of the q cavities 111.$i$ which are integrated into the structured layer 113 or formed in the structured layer 113 (with q≥2).

FIGS. 1A and 1B show details of the structured layer 113. In FIGS. 1A and 1B one can see the encircling walls 117 which define the cavities 111.$i$. In the present embodiment, the encircling walls 117 are designed so that they also define two opposed constrictions 115.

In at least some embodiments, the encircling wall(s) 117 is/are electrically connected to the metal layer 112 so as to provide for a low impedance connection.

In at least some embodiments, one encircling wall(s) 117 is/are provided which define the shape and size of all cavities 111.$i$. This means that the individual cavities 111.$i$ are "connected".

In at least some embodiments, the metal layer 112 is structured so that it comprises a central (metal) base, land or bridge 205 (cf. FIG. 1C). In case of the first embodiment, the central metal base 205 is on both sides delimited by the two inner boundary slots 203.1 (not visible in FIG. 1C) and 203.2 (visible in FIG. 1C).

The central metal base 205 defines or serves as central feed point FP (cf. FIG. 1C) of the respective radiator group 110. A central feed point FP is a point which defines or establishes a transition from the planar structure to a hollow waveguide 150.

In at least some embodiments, a double-ridged waveguide 150.$d$ serves as hollow waveguide 150. The embodiment of FIGS. 1A-1C comprises a double-ridged waveguide 150.$d$. The respective double-ridged waveguide 150.$d$ has an orientation perpendicular to the x-y-plane. That is, an electromagnetic wave is propagating inside the double-ridged waveguide 150.$d$ in a direction parallel to the z-axis.

In at least some embodiments, a single-ridged waveguide 150.$s$ serves as hollow waveguide 150. The embodiment of FIGS. 3A-3C, for example, comprises a single-ridged waveguide 150.$s$. The respective single-ridged waveguide 150.$s$ runs parallel to the x-y-plane and has preferably an orientation either parallel to the x, or parallel to the y-axis. That is, an electro-magnetic wave is propagating inside the single-ridged waveguide 150.$s$ in a plane parallel to the x-y-plane.

In at least some embodiments, the conduit of the waveguide 150 might be slightly expanded at the transition to the planar structure so as to improve the coupling efficiency.

In the following, specific details of various embodiments are addressed. The respective details can be used in connection with the other embodiments. If needed, adaptations/modifications might be necessary.

The table 1 gives an overview of the various embodiments.

FIG. 1A shows a top view of elements of the first embodiment. The respective apparatus 100 comprises two patch-shaped elements 201.$i$ (1≤i≤n, n=2) and each two slots 202.$i$ (1≤i≤m, m=2) and 203.$i$ (1≤i≤k, k=2). The structured metal layer 112 has a rectangular shape and it covers the structured layer 113 (if the apparatus 100 is assembled). In the present embodiment, the boundary slots 202.$i$, 203.$i$ have the shape of square brackets.

The boundary slots 202.$i$, 203.$i$ of at least some embodiments may also be rounded off e.g. up to a semi-circular shape, wiggled or follow a zig-zag line (similar to the letter "W"). The boundary slots 202.$i$, 203.$i$ can also vary in width, as to modify/minimize the etching/laser cut tolerance sensitivity.

The structured layer 113 here comprises a frame or flange 114 (cf. FIG. 1B). This frame or flange 114 defines a plane parallel to the x-y-plane. The lower most plane of the structured metal layer 112 might rest right on this frame or flange 114 (if the apparatus 100 is assembled). The n=2 cavities 111.1, 111.2 are defined in this structured layer 113. Each cavity 111.$i$ comprises encircling walls 117, which are erected perpendicular to the x-y-plane, and a bottom plane or plate which extends parallel to the x-y-plane.

In at least some embodiments, the cavities 111.$i$ have a depth d3 (cf. FIG. 1C) in the range between 0.2 and 0.6 mm.

In at least some embodiments, the structured layer 113 is a 3D-printed element or an injection molded element. Likewise, the structured layer 113 may be designed so that it can be etched or milled, for example. The respective element might be metallized to the extent needed.

In the present embodiment, the cavities 111.$i$ have a rectangular shape or outline. As mentioned before, each of these cavities 111.$i$ comprises two opposite constrictions 115. These constrictions 115 may have a tongue or latch shape, as illustrated in FIG. 1A, 1B. The constrictions 115 serve as inductive iris. The inductive iris may be employed in all embodiments in order to be able to adjust the excitation behavior (amplitude and/or phase) of the other boundary slots 202.$i$ In at least some embodiments, the two opposite constrictions 115 are situated right underneath suspension arms 204.1 and 204.$r$ of the patch-shaped elements 201.$i$. Two of these suspension arms 204.1 and 204.$r$ are shown in FIG. 1C.

In at least some embodiments, the structured layer 113 comprises a central opening 116 (cf. FIG. 1B) so as to provide for a coupling with a double-ridged waveguide 150.$d$, for example. In the present embodiment, the central opening 116 has an H-shaped outline.

In at least some embodiments, The H-shaped central opening 116 is designed and positioned so that the respective patch pair is capacitively excited by the opening 116 and that the respective radiator group 110 provides a dominant radiation parallel to the z-axis (Ey-polarization).

In at least some embodiments, the central opening 116 of the structured layer 113 is situated underneath the central metal base, land or bridge 205. That is, in a top view of the apparatus 100 most of the central opening 116 is covered/concealed by the metal base 205. In FIG. 1A the structured metal layer 112 is transparent so that all relevant details of the structured layer 113 are visible.

FIG. 1C shows a perspective exploded view of the structured metal layer 112, the structured layer 113, and the waveguide 150.$d$ of the first embodiment. The elements of this apparatus 100 are cut parallel to the y-z-plane so that one can see details inside the structured layer 113 and the waveguide 150.$d$. One ridge 151 of the double-ridged waveguide 150.*d* is visible in this figure. The double-ridged waveguide 150.*d* as such comprises an open inner conduit which has a rectangular or square cross-section in the x-y-plane. There are two opposite ridges 151 which protrude into the conduit. The open inner conduit thus typically has an H-shape in a cross-section parallel to the x-y-plane.

The thickness d1 of the metal layer 112 of at least some embodiments may be in the range between 0.05 and 0.25 mm. The thickness d2 (excluding the waveguide 150) of the structured layer 113 may be in the range between 0.6 and 1 mm. The overall thickness (d1+d2) of the planar structure thus is smaller than 1.25 mm, for 77 GHz radar applications.

Figure 2A:
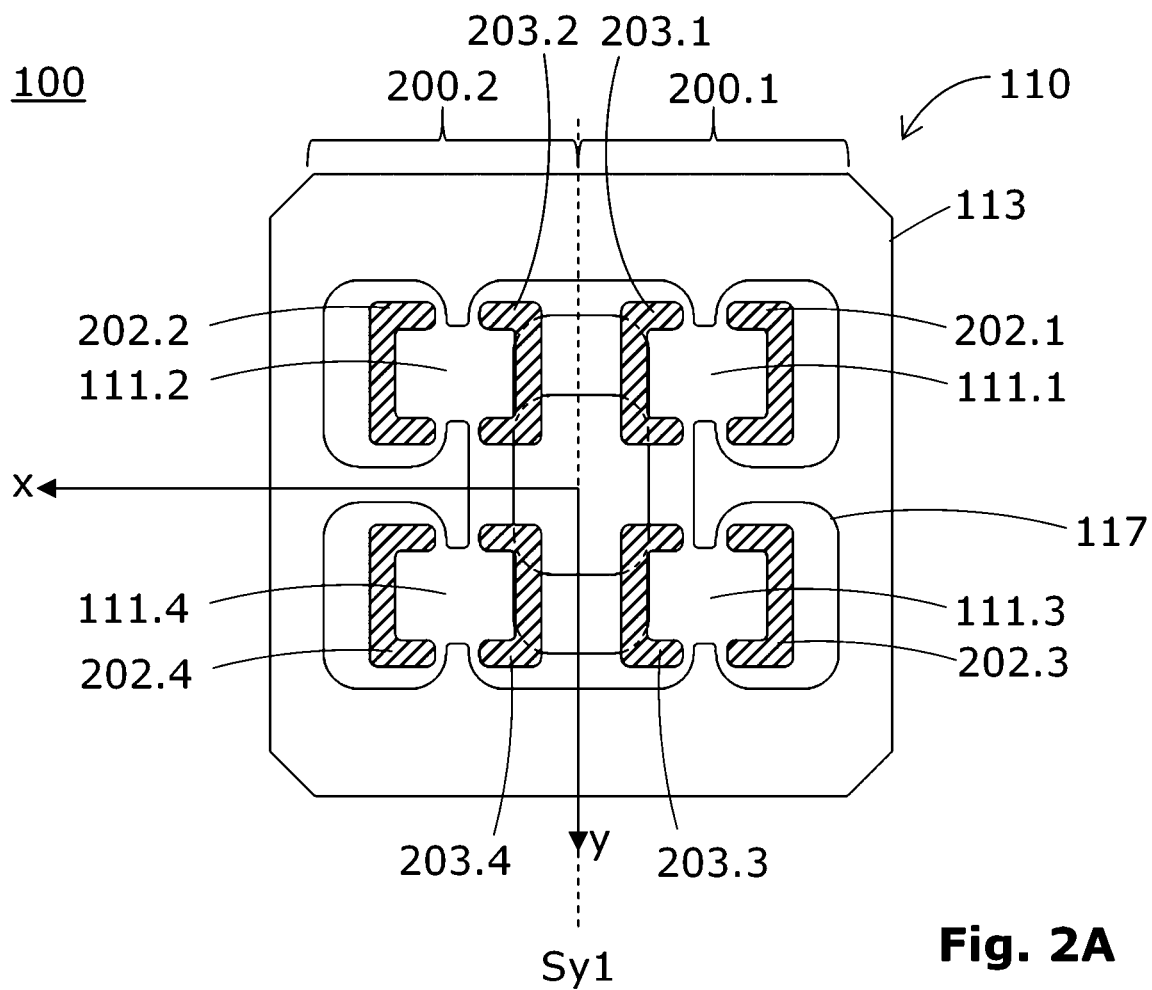
FIG. 2A schematically shows a top view of a second embodiment of an apparatus of the present disclosure which comprises four patch-shaped elements and eight slots.
Figure 2B:
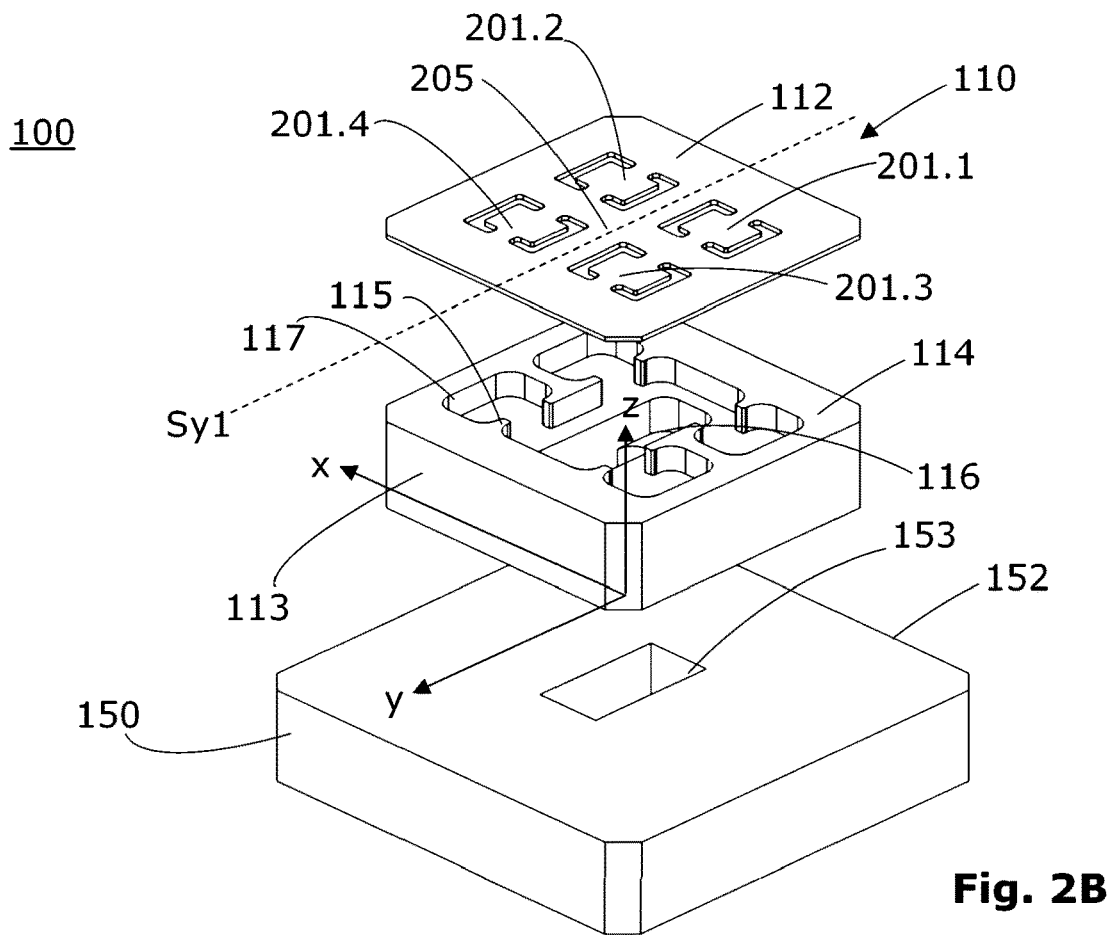
FIG. 2B schematically shows a perspective exploded view of the second embodiment of FIG. 2A.
Figure 2C:
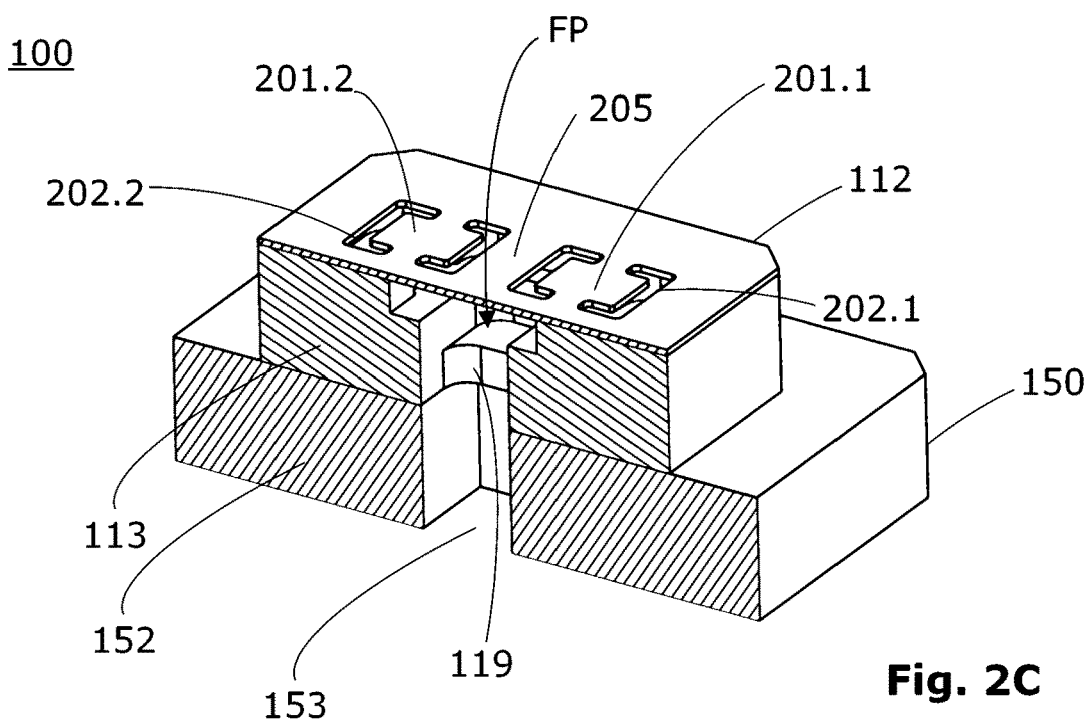
FIG. 2C schematically shows a perspective sectional view of the structured metal layer, the structured layer, and the waveguide of the second embodiment of FIG. 2A.

FIGS. 2A-2C show details of a second embodiment of an apparatus 100 which comprises four patch-shaped elements 201.*i* ($1 \leq i \leq n$, n=4) and eight slots 202.*i* ($1 \leq i \leq m$, m=4), 203.*i* ($1 \leq i \leq k$, k=4). The structured metal layer 112 has an approximately square shape. It covers the structured layer 113, which has a square shape, too. The corners may be chamfered. The boundary slots 202.*i*, 203.*i* have the shape of square brackets.

The structured layer 113 (cf. FIG. 2B) comprises a frame or flange 114. This frame or flange 114 defines a plane parallel to the x-y-plane. The lower most plane of the structured metal layer 112 might rest right on this frame or flange 114. There are n=4 cavities 111.1, 111.2, 111.3, 111.4 defined in this structured layer 113. Each cavity 111.*i* comprises encircling walls 117 which have an orientation perpendicular to the x-y-plane and a bottom plane or plate which extends parallel to the x-y-plane.

In at least some embodiments, a standard rectangular waveguide flange (e.g. a WR-12 E-band flange) might be used.

The structured layer 113 (cf. FIG. 2B) is specifically designed so that it can be produced by means of a milling process, for example.

The cavities 111.*i* of at least some embodiments might have rounded corners between adjacent wall segments and/or rounded edges at the transition between the encircling walls 117 and the frame or flange 114.

Each cavity 111.*i* comprises two opposite tongue- or latch-shaped constrictions 115. These constrictions 115 serve as inductive iris.

In the present embodiment, a standard hollow waveguide flange serves as waveguide 150. This waveguide 150 comprises a waveguide body 152 and a central conduit 153. The central conduit 153 typically has a rectangular shape in a cross-section parallel to the x-y-plane.

In this embodiment, the structured layer 113 comprises a central opening 116 so as to provide for a coupling with the standard hollow waveguide flange 150, as illustrated in FIG. 2B, 2C. This central opening 116 is aligned with respect to the central conduit 153.

In all embodiments, the waveguide 150 or part of the waveguide (e.g. a flange) might be integrated into the structured layer 113.

At least some of the embodiments comprise an inductive iris being integrated into the central opening or through hole 116 of the structured layer 113. FIG. 2C shows a portion of a constriction 119 which serves as inductive iris. This constriction 119 is situated at the transition between the structured layer 113 and the conduit 153 of the waveguide 150.

Figure 3A:
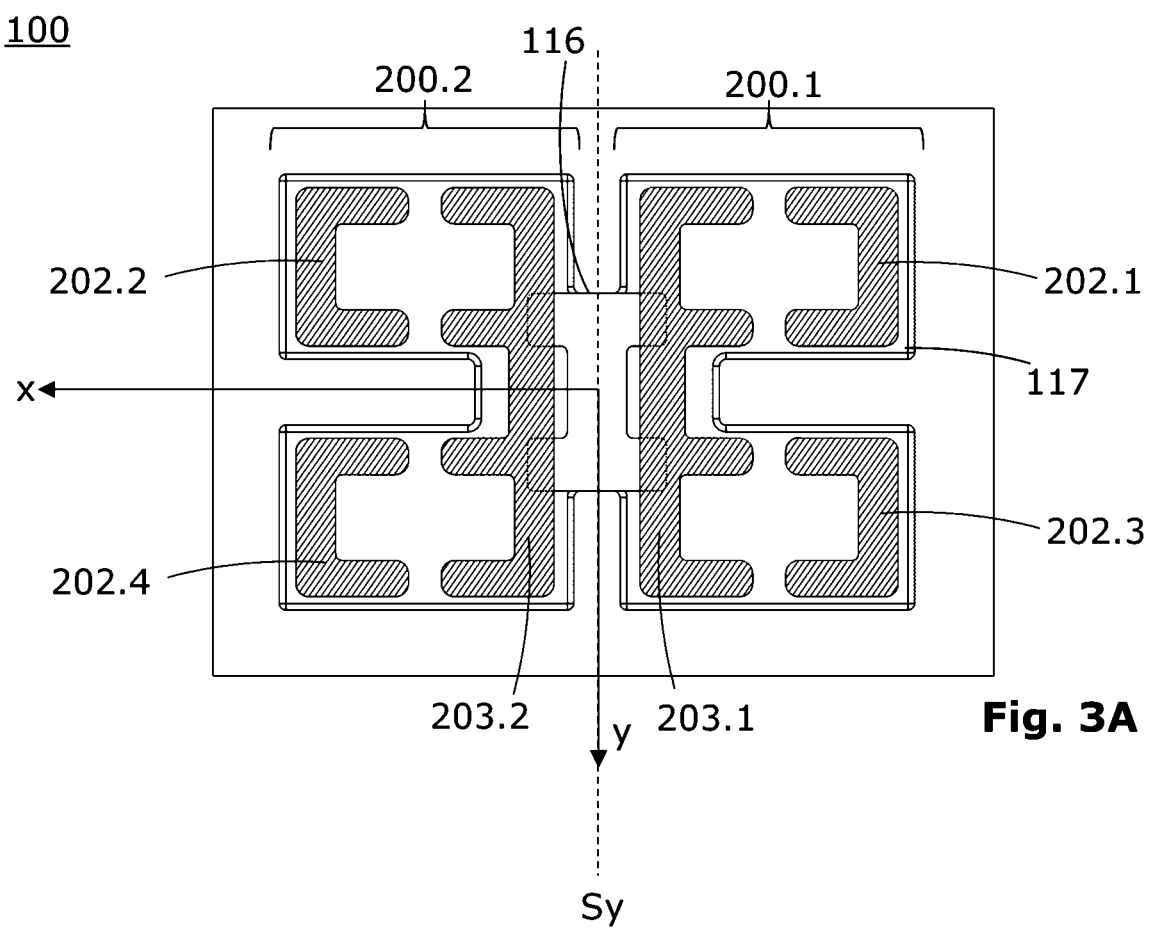
FIG. 3A schematically shows a top view of a third embodiment of an apparatus of the present disclosure which comprises four patch-shaped elements and six slots.
Figure 3B:
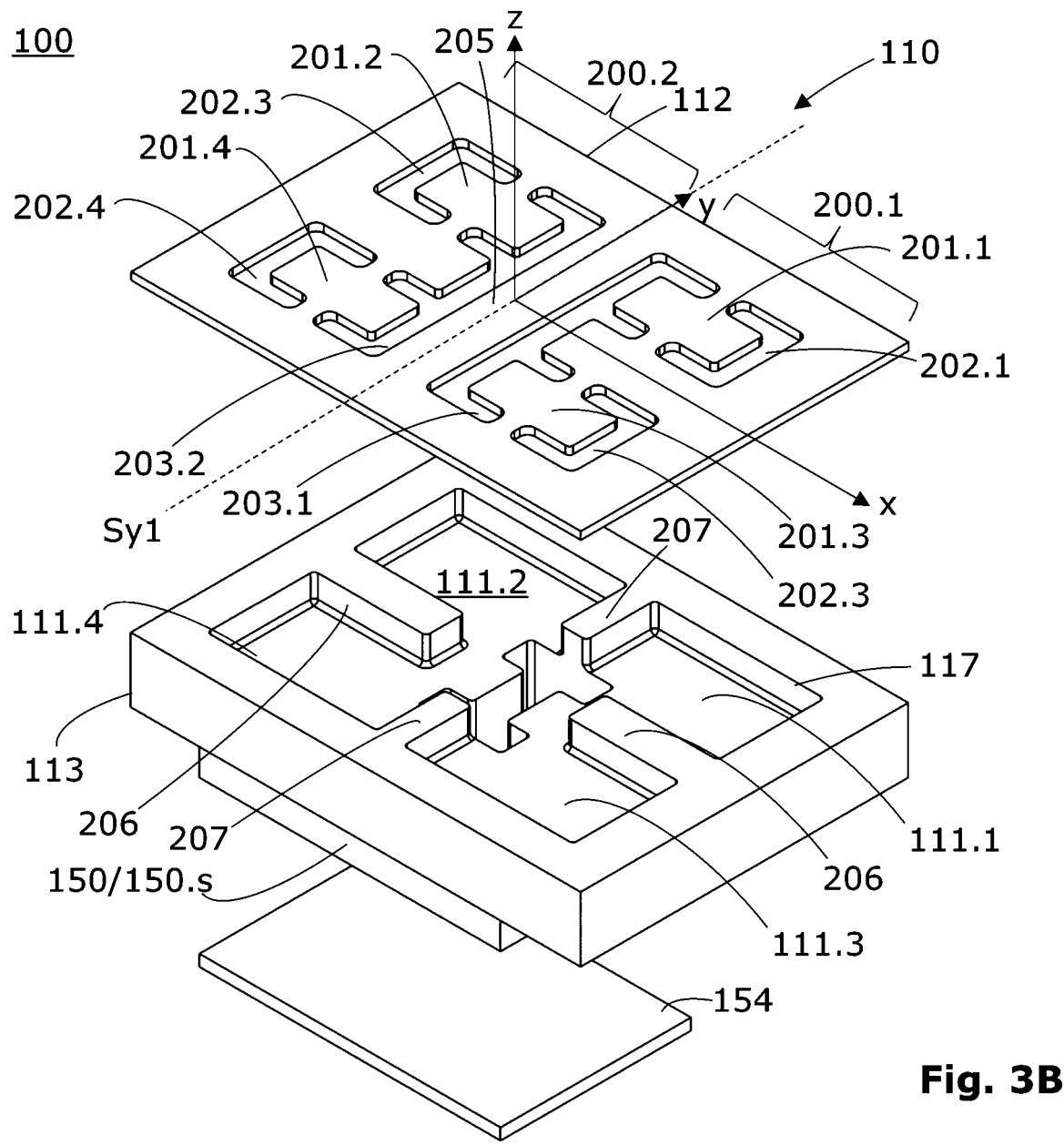
FIG. 3B schematically shows a perspective exploded view of the structured metal layer, the structured layer, the waveguide, and the cover lid of the third embodiment of FIG. 3A.
Figure 3C:
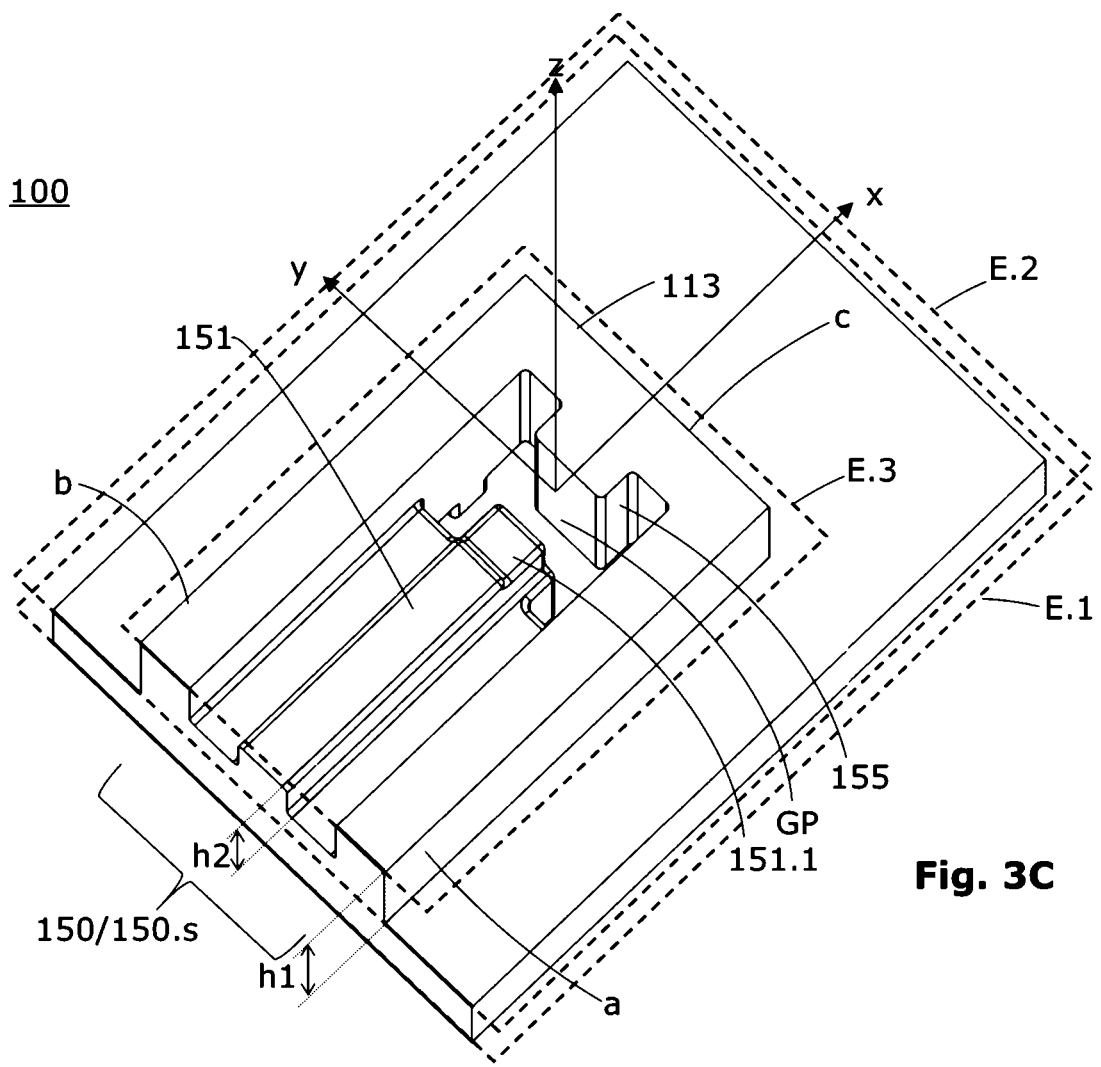
FIG. 3C schematically shows a perspective bottom view of the third embodiment of FIG. 3A.

FIGS. 3A-3C show a third embodiment where the apparatus 100 comprises four patch-shaped elements 201.1-201.*n* and six slots 202.1-202.*m*, 203.1-203.*k* (n=4, m=4, and k=2). The structured metal layer 112 has a rectangular shape. It covers the structured layer 113, which has a rectangular shape, too. The outer boundary slots 202.*i* have the shape of square brackets. The inner boundary slots 203.*i* have a comb-like structure, which can be regarded as 2 u-shaped slots connected by a straight slot section. A central metal base 205 (cf. FIG. 3B) is provided which again defines or serves as central feed point FP of the respective radiator group 110.

As one can see in FIG. 3B, the cavities 111.*i* have a pairwise arrangement, where two adjacent cavities 111.1, 111.3 as well as 111.2, 111.4 are separated by a ridge or land 206. I.e., there are two pairs of cavities 111.1, 111.3 and 111.2, 111.4 and two ridges or lands 206. These ridges or lands 206 have a longitudinal extension parallel to the x-axis. In addition, there are two shorter transversal ridges or lands 207 having a longitudinal extension parallel to the y-axis.

There is a single-ridged waveguide 150.*s* situated underneath the structured layer 113. A curly bracket in FIG. 3C indicates the open end of the single-ridged waveguide 150.*s*. The single-ridged waveguide 150.*s* is oriented parallel to the x-y-plane so that an electro-magnetic wave travels parallel to the x-axis.

In at least some embodiments, the apparatus 100 comprises an inductive element being combined with an inductive ridged waveguide E-bend, as illustrated in FIG. 3C. The ridge 151 of the waveguide 150.*s* of FIG. 3C has an end portion 151.1 with a reduced height which is smaller than h2. The ridge 151 of the waveguide 150.*s* of FIG. 4B, too, has an end portion 151.1 with a reduced height.

In at least some embodiments, the apparatus 100 has the following layer composition (from the top to the bottom, if one looks at the orientation of the apparatus 100 given in FIG. 3B): structured metal layer 112, structured layer 113, single-ridged waveguide 150.*s*, and an optional cover lid 154.

The footprint of the single-ridged waveguide 150.*s* in the present embodiment is much smaller than the footprint of the layers 112 and 113. In the bottom view of FIG. 3C, the single-ridged waveguide 150.*s* has the shape of rectangular pedestal or platform. The single-ridged waveguide 150.*s* comprises a central ridge 151 which extends parallel to the negative x-axis. This ridge 151 is situated inside a rectangular conduit of the waveguide 150.*s*. The side walls a, b and the end wall c enclose the rectangular conduit on three sides. These walls a, b, c have a height h1 with respect to the level of the lower most plane E.2 of the structured layer 113. The height h2 of the ridge 151 is smaller (i.e. h2<h1). The open end (in FIG. 3C on the left hand side) of the single-ridged waveguide 150.*s* in the present embodiment is situated in a plane parallel to the y-z-plane.

In at least some embodiments, there is an air gap GP between an end facet of the ridge 151 and the end wall c. The respective end facet of the ridge 151 has an orientation parallel to the y-z-plane in the embodiment of FIG. 3C.

The lower most plane E3 of the single-ridged waveguide 150.*s* is covered by a cover lid 154 (e.g. a metal sheet or a PCB-cladding). This cover lid 154 is shown in FIG. 3B. In FIG. 3C the cover lid 154 is omitted.

Figure 4A:
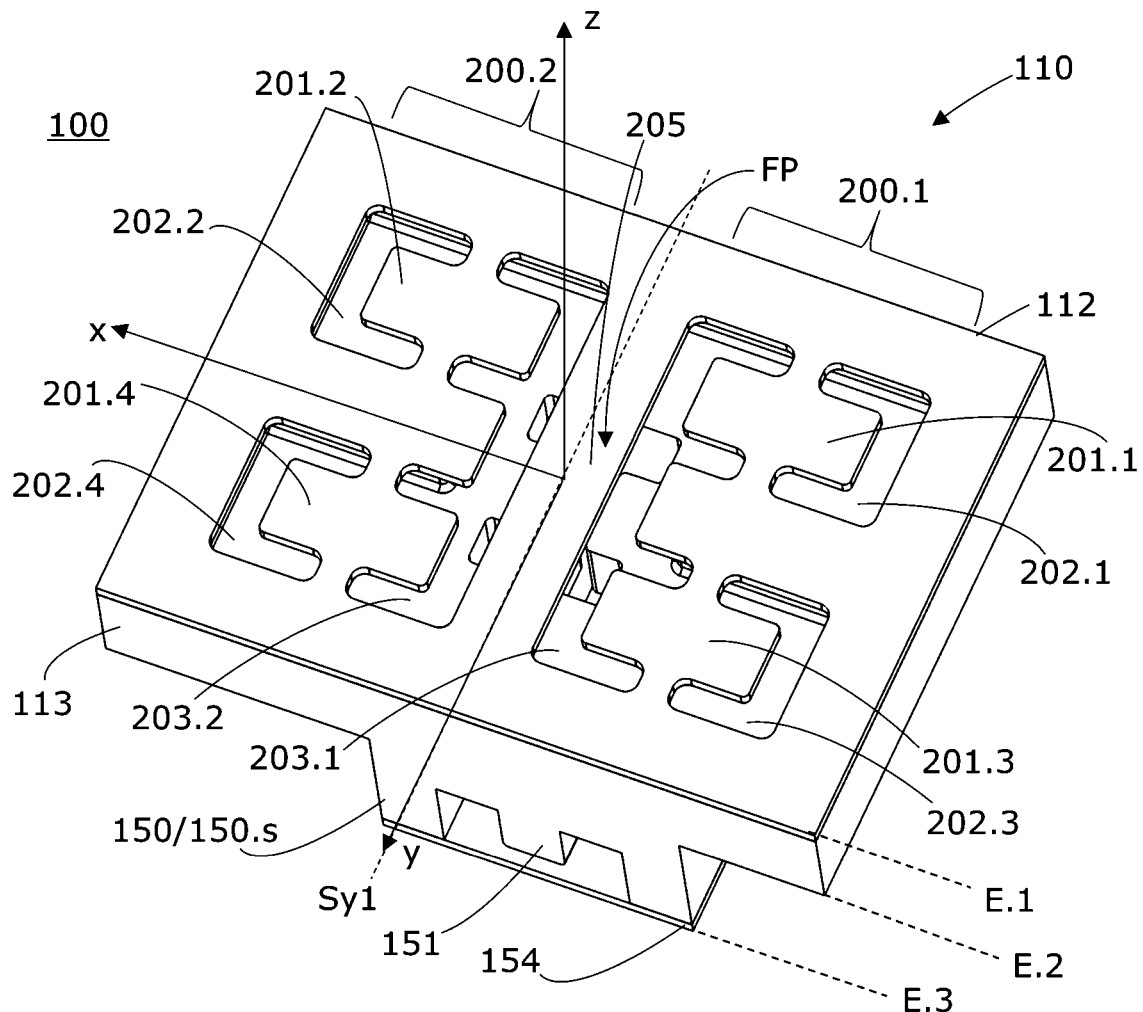
FIG. 4A schematically shows a perspective top view of a fourth embodiment of an apparatus of the present disclosure which comprises four patch-shaped elements, six slots, and single ridge waveguide feed in a parallel orientation.

FIG. 4A shows a perspective top view of a fourth embodiment of an apparatus 100 which comprises n=4 patch-shaped elements 201.*i*, six slots 202.*i* ($1 \leq i \leq m$, m=4), 203.*i* ($1 \leq i \leq k$, k=2), and a single ridge waveguide 150.*s* in a parallel orientation. The single-ridged waveguide 150.*s* is oriented parallel to the x-y-plane so that an electro-magnetic wave travels parallel to the y-axis. The waveguide 150.*s* of FIG. 4A is rotated 90 degrees with respect to the waveguide 150.*s* of FIG. 3A.

In FIG. 4A, the levels of the various planes E.1, E.2, and E3 are depicted by dashed lines. The general description of FIGS. 3A-3C applies to FIGS. 4A, 4B too. The main difference is the orientation of the single ridge waveguide 150.s and the coupling of the single ridge waveguide 150.s to the feed point FP of the structured metal layer 112.

Figure 4B:
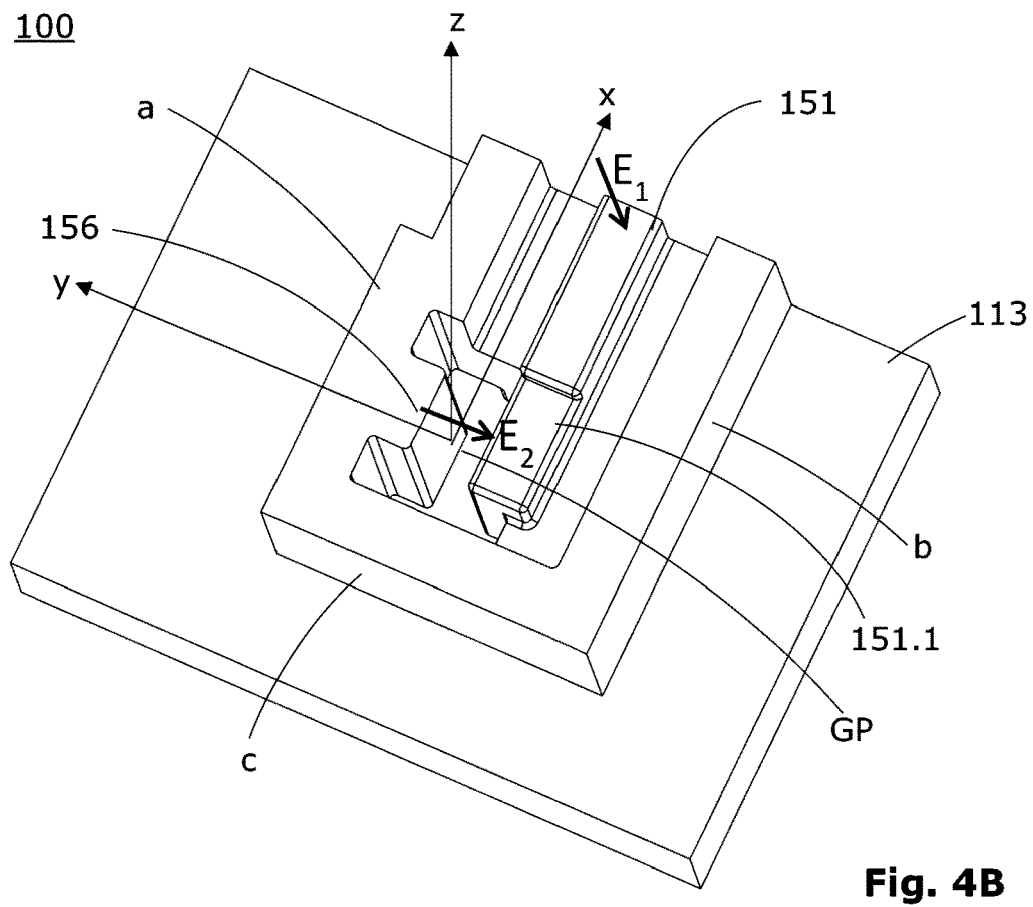
FIG. 4B schematically shows a perspective bottom view of the single ridge waveguide feed of the apparatus of FIG. 4A.

FIG. 4B shows a perspective bottom view of FIG. 4A. Like in FIGS. 3A-3C, the ridge 151 has a lower height h2 than the surrounding walls a, b, c (i.e. h2<h1). The embodiment of FIGS. 3A-3C comprises an end wall c with a central protrusion 155. The embodiment of FIGS. 4A, 4B comprises no such protrusion attached to or integrated into the end wall c.

The central protrusion 155 resembles one half of a double ridged waveguide.

The embodiment of FIGS. 4A, 4B, however, may comprise a side wall a with a protrusion 156 (cf. FIG. 4B).

The embodiment of FIGS. 4A, 4B provides for a 90° E-field twist, as indicated in FIG. 4B by means of two arrows E1 and E2.

Figure 5A:
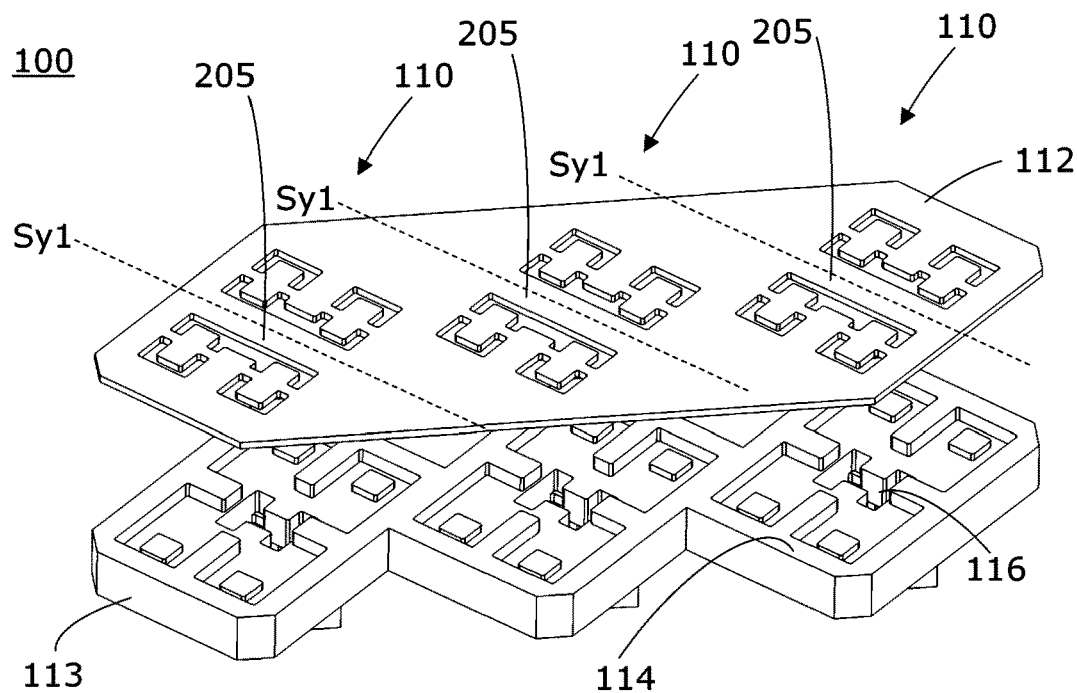
FIG. 5A schematically shows an exploded perspective top view of a fifth embodiment of an apparatus of the present disclosure which comprises an array with three radiator groups, wherein each radiator group comprises four patch-shaped elements and six slots.
Figure 5B:
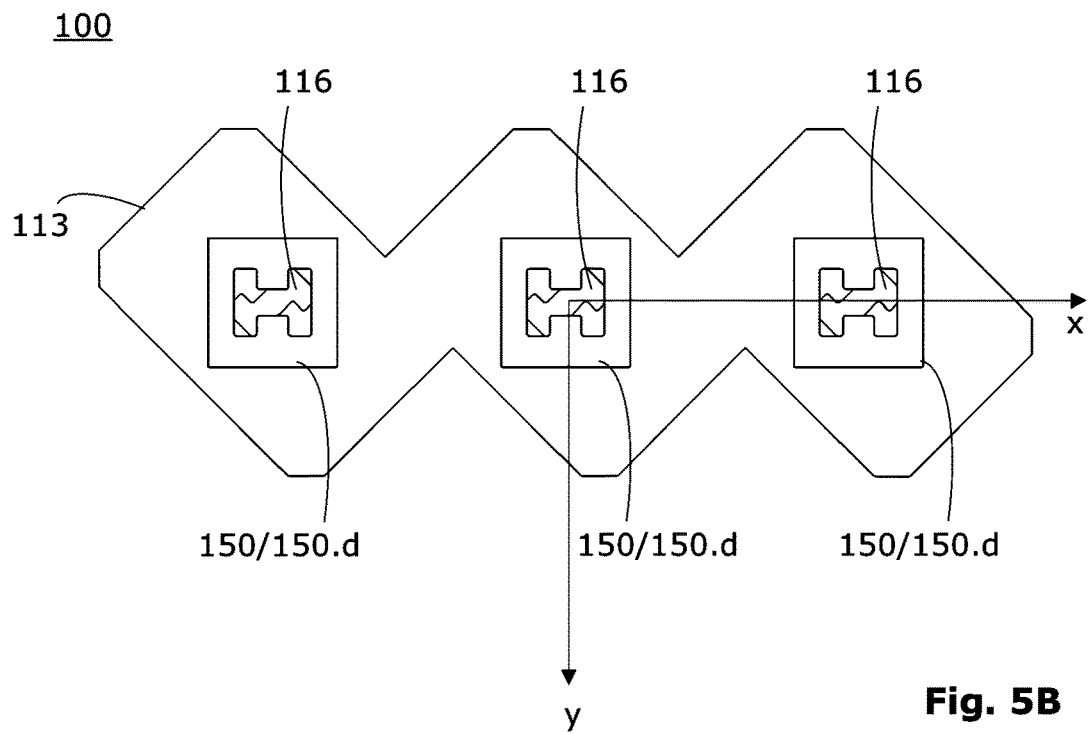
FIG. 5B schematically shows a bottom view of the fifth embodiment of FIG. 5A.
Figure 5C:
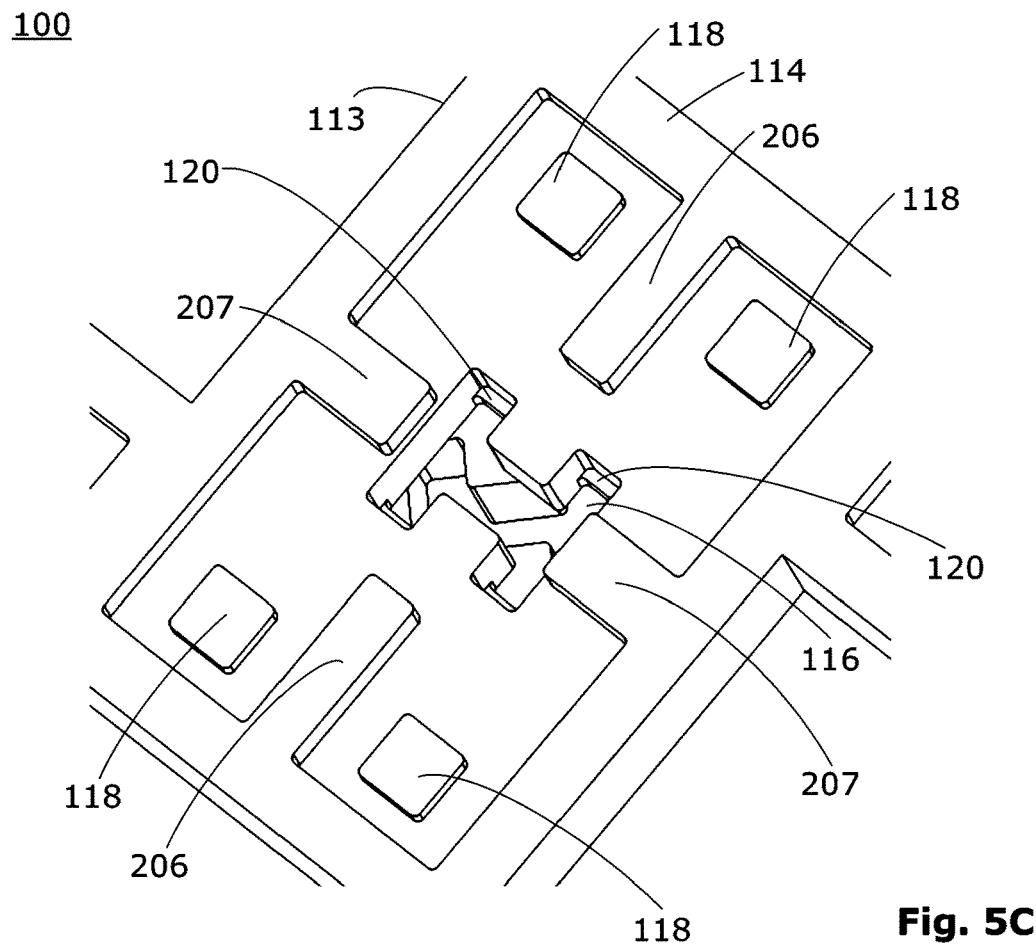
FIG. 5C schematically shows a perspective top view of a section of the fifth embodiment of FIG. 5A.

FIG. 5A shows a perspective top view of a fifth embodiment of an apparatus 100. This apparatus 100 comprises an array with three radiator groups 110, wherein each radiator group 110 comprises n=4 patch-shaped elements 201.i and six slots 202.i (1≤i≤m, m=4), 203.i (1≤i≤k, k=2). FIG. 5B shows a bottom view of the apparatus 100, and FIG. 5C shows a perspective top view of a portion of the structured layer 113 and of one of the waveguides underneath. The structured metal layer 112 and the structured layer 113 are subdivided into 3 segments or portions which are structurally identical.

FIG. 5B shows that in this embodiment the waveguides 150 can be rotated by 45 degrees with respect to the orientation of the H-shaped central opening or through hole 116. This feature enables very compact embodiments.

The embodiment of FIG. 5A, 5B has the advantage that the space between adjacent radiator groups 110 can be used for feed network routing purposes within a plane parallel to the x-y-plane.

The embodiment of FIG. 5A, 5B with 45 degrees twisted feed ports might be used as a 45 degrees polarized steered-beam array antenna, for example.

The structured metal layer 112 may comprise an arrangement of slots 202.i, 203.i which is similar to the arrangement shown and described in connection with FIG. 3A, 3B, for example.

The structured layer 113 may comprise a frame or flange 114 enclosing 3 times n=4 cavities 111.i. For each of the three radiator groups 110, there are two lands or latches 206, 207 which delimit the n=4 cavities 111.i. In the middle between these four lands or latches 206, 207 there is an H-shaped central opening (through hole) 116 (cf. FIG. 5C).

Figure 6:
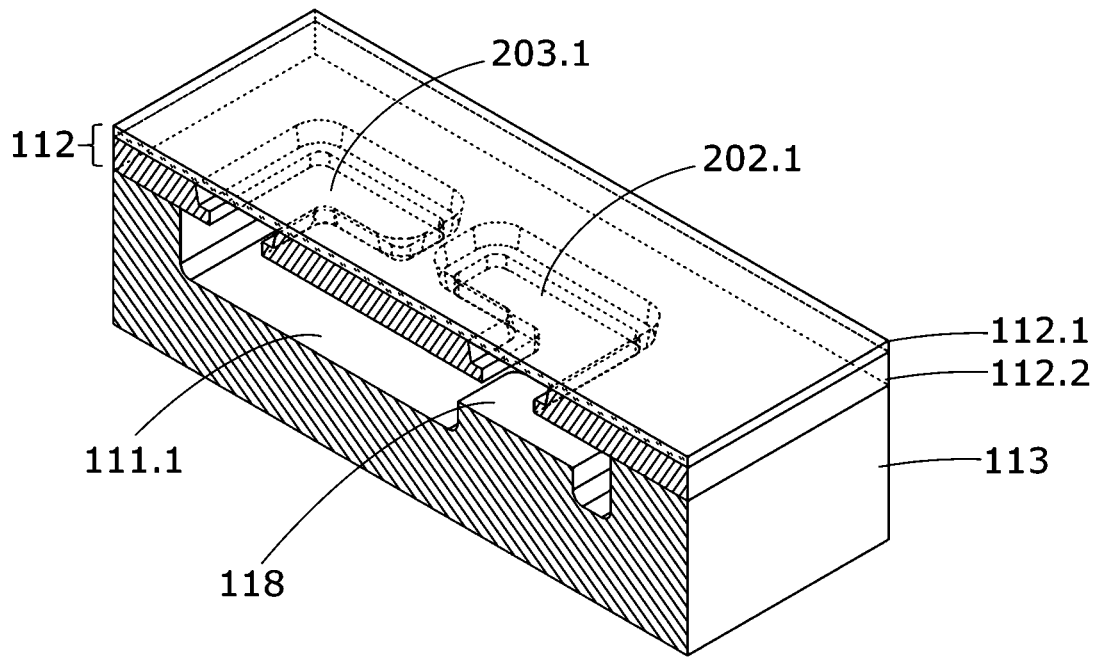
FIG. 6 schematically shows a perspective cross-section of a sixth embodiment of an apparatus of the present disclosure.

In at least some embodiments, there is one small pedestal or pad 118 per cavity 111.i, as illustrated in FIG. 5C and FIG. 6, for example. The pedestal or pad 118 serves as capacitive element which is designed in order to influence the coupling (phase and amplitude) of the outer boundary slots 202.i. The respectively designed and positioned pedestals or pads 118 inside the cavities 111.i enable the reduction of radiation side lobes.

At least some of the embodiments comprise constrictions 120 which provide for an additional shunt inductivity, as illustrated in FIGS. 1B and 5C. These constrictions 120 are situated at the transition between the structured layer 113 and the conduit 153 of the waveguide 150 so as to provide for an inductive input coupling. In FIG. 1B, all four constrictions 120 are provided with reference numbers. In FIG. 5C, two of the four constrictions 120 are provided with reference numbers.

FIG. 6 schematically shows a perspective cross-section through one cavity 111.1 of a sixth embodiment (with n=4, k=2, m=4, q=4) of an apparatus 100. In this embodiment, the structured metal layer 112 comprises a sandwich of two sublayers. There is a metal sheet 112.2 which is unisotropically etched in order to provide the desired structuring. On top there is a (dielectric) cover layer or film 112.1 (e.g. a layer or film designed in order to provide for a protection against humidity and dust). These two sublayers 112.1, 112.2 are arranged on top of the structured layer 113, as before.

Figure 7A:
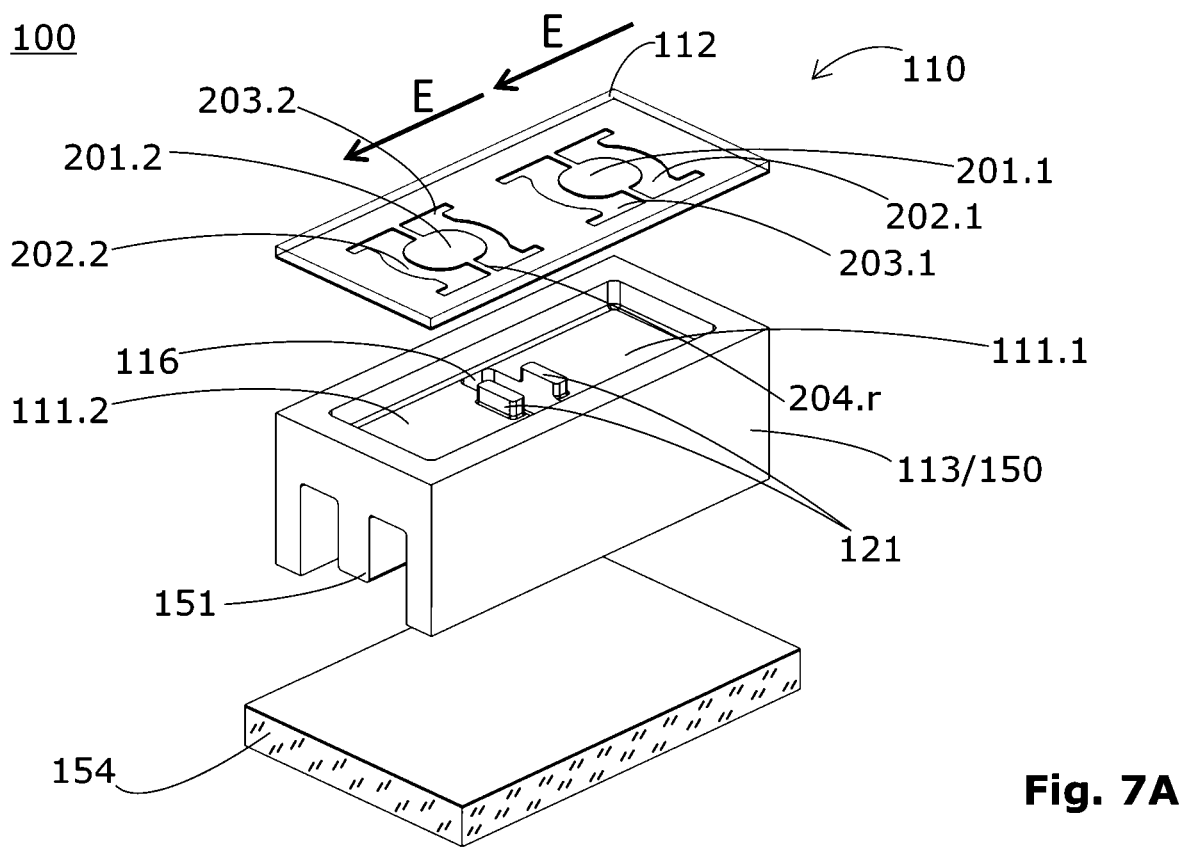
FIG. 7A schematically shows a perspective exploded view of a seventh embodiment of an apparatus of the present disclosure which comprises two patch-shaped elements, four slots, and single ridge waveguide in a parallel orientation.
Figure 7B:
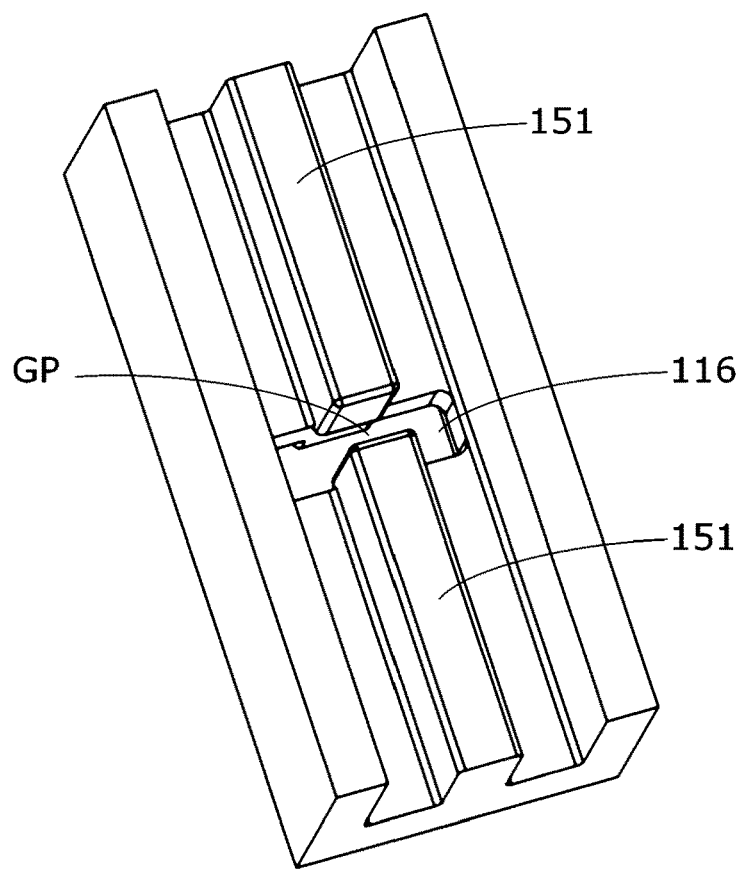
FIG. 7B schematically shows a perspective bottom view of the apparatus of FIG. 7A.
Figure 7C:
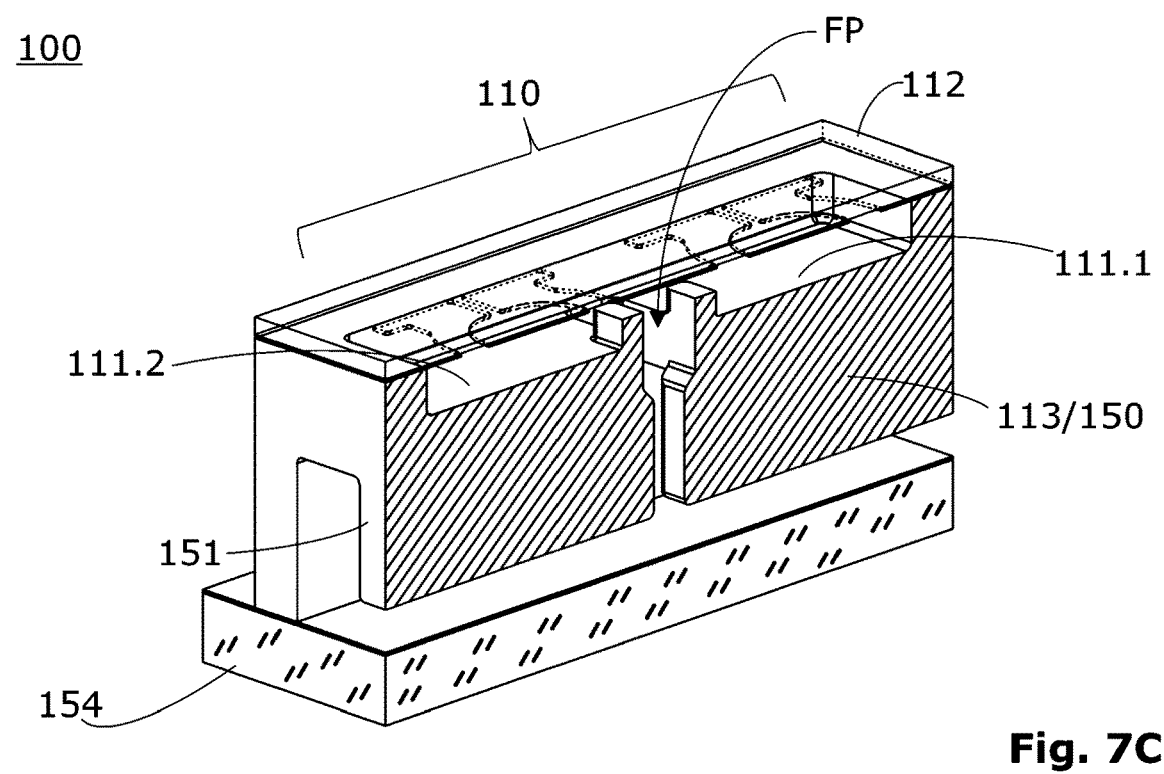
FIG. 7C schematically shows a perspective cross-section of the apparatus of FIG. 7A.

FIGS. 7A-7C schematically show a seventh embodiment of an apparatus 100 which comprises two patch-shaped elements 201.i, four slots 202.i (1≤i≤m, m=2), 203.i (1≤i≤k, k=2), and single ridge waveguide 150.s in a parallel orientation. The structural features/elements of the waveguide 150 and the features/elements of the structured layer 113 are integrated into one body. A dielectric carrier substrate which comprises a rear side with a structured metal (e.g. a copper cladding layer) serves as structured metal layer 112. In FIG. 7A, the E-field orientation is shown by means of two arrows E.

The structure of FIG. 7A can be used in 1-port and 2-port embodiments. FIG. 7B shows a 2-port embodiment where two ridges 151 are employed. One of these ridges 151 is situated on the left hand side of the central opening or through hole 116 and one of these ridges 151 is situated on the right hand side of the central opening or through hole 116. There is an air gap GP between the two opposite end facets of these two ridges 151 which provide for a transformation of the feed point FP impedance (depicted in FIG. 7C).

There is a cover lid 154 (e.g. a multilayer PCB) which covers at least part of the waveguide 150.

The embodiment of FIGS. 7A-7C comprises very thin suspension arms 204.1 and 204.r, as compared to the suspension arms 204.1 and 204.r of FIG. 1C, for example. This is rendered possible by the mechanical support function of the dielectric carrier substrate. In FIG. 7A only one suspension arm 204.r carries a reference number.

In at least some embodiments, the suspension arms 204.1 and 204.r are accompanied by constrictions or protrusions 115 which are situated right underneath the suspension arms 204.1 and 204.r.

The embodiment of FIGS. 7A-7C might be used in high-gain, low sidelobe, classical steered beam antenna arrays, for example.

In at least some embodiments, small ridges or protrusions 121 might be employed to the right and left of the central opening or through hole 116. These ridges or protrusions 121 are regarded to be equivalent (as far as the cut-off frequency is concerned) with respect to a double ridged waveguide.

TABLE 1

| Embod. | Number of patches 201.i, i ≤ n | Number of inner boundary slots 203.i, i ≤ k | Number of outer boundary slots 202.i, i ≤ m | Number of cavities 111.i, i ≤ q |
|---|---|---|---|---|
| No 1 | n = 2 | k = 2 | m = 2 | q = 2 |
| No 2 | n = 4 | k = 4 | m = 4 | q = 4 |
| No 3 | n = 4 | k = 2 | m = 4 | q = 4 |
| No 4 | n = 4 | k = 2 | m = 4 | q = 4 |

TABLE 1-continued

| Embod. | Number of patches 201.i, i ≤ n | Number of inner boundary slots 203.i, i ≤ k | Number of outer boundary slots 202.i, i ≤ m | Number of cavities 111.i, i ≤ q |
|---|---|---|---|---|
| No 5 | 3 × (n = 4) | 3 × (k = 2) | 3 × (m = 4) | 3 × (q = 4) |
| No 6 | n = 4 | k = 2 | m = 4 | q = 4 |
| No 7 | n = 2 | k = 2 | m = 2 | q = 2 |

Figure 8:
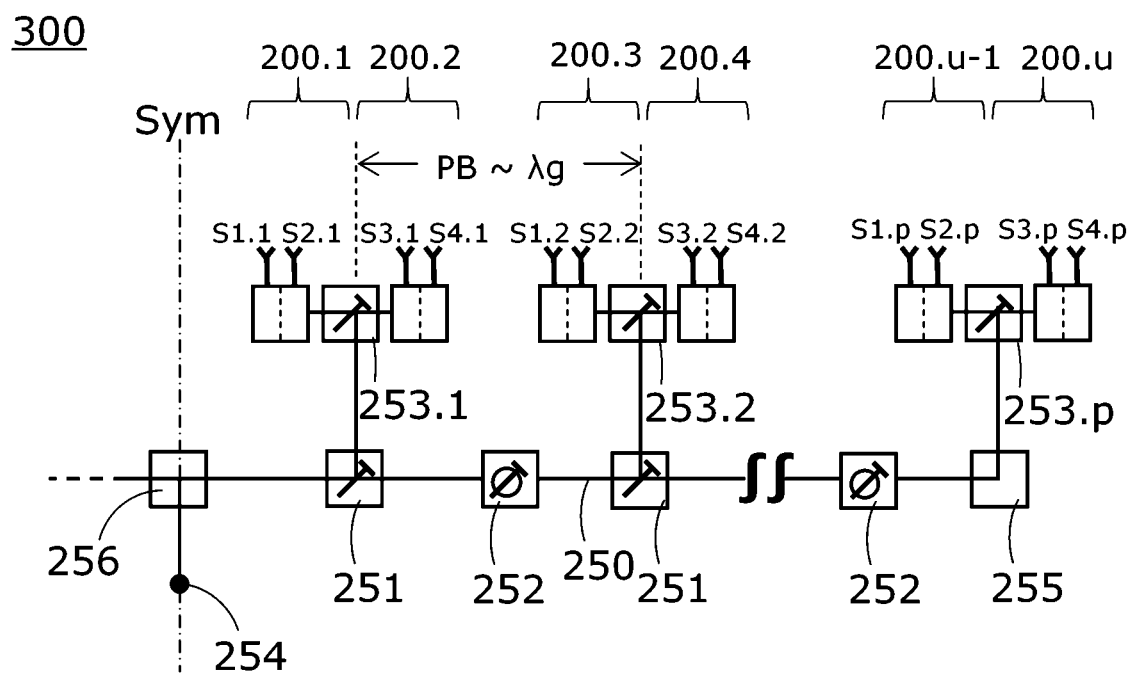
FIG. 8 shows a schematic block diagram of another embodiment which comprises an array of radiator groups and waveguide feeds.

FIG. 8 shows a schematic block diagram of an embodiment of a radar apparatus 300 which comprises an array of radiator groups 110. The drawing of FIG. 8 shows one half of the array. There is a line of symmetry Sym. The shown elements are mirrored at this line Sym in order to obtain a full array. The shown half of the array comprises u building blocks 200.i, i.e. the total array has 2u building blocks. Each building block 200.i consist of 2 radiating slots, therefore one half of the array comprises p=u/2 quadruples of radiating slots (S1.i, S2.i, S3.i, S4.i; the total number of individual slots is 8p=4u). The shortest array constituting a radar apparatus 300 consists of two symmetrically arranged radiator groups 110, i.e. u is an even integer number and obeys the relation u≥2. Therefore, p≥1, relating to a minimum number of eight radiating slots.

There is a common feed waveguide 250. The common feed waveguide 250 comprises adjustable power taps 251 and interstage phase compensation blocks 252. The present embodiment comprises 2 times p radiator groups 110. Per half of the array there are thus p−1 interstage phase compensation blocks 252. Each of said radiator groups 110 comprises an adjustable power division block 253.i (1≤i≤p) and two building blocks 200. Each building block 200 comprises one patch-shaped element 201.i (2≤i≤u) and two boundary slots 202.i, 203.i serving as radiating slots. The radiating slots (herein referred to as outer boundary slots and inner boundary slots) are symbolized as small antenna elements pointing upwards. The antennas S1.i and S4.i represent outer boundary slots 202.i and the antennas S2.i and S3.i represent inner boundary slots 203.i. The dashed lines which divide each building block 200 into two halves symbolize means for the adjustment of excitation of the respective slots 202.i, 203.i (i.e., the dashed lines symbolize the combined effect of suspension arms 204.1, 204.r, the optional constrictions 115 and/or capacitive pedestals 118). The two halves of the array constituting the apparatus 300 are being fed by symmetrical power division block 256, which has an input/output node or feed point 254.

The respective embodiment might comprise feed waveguide termination 255. In case of the shortest array constituting radar apparatus 300, waveguide terminations 255 and associated building blocks 200.1 and 200.2 on one side, 200.3 and 200.4 on the other side, are directly attached to the common feed waveguide. I.e., adjustable power taps 251 and interstage phase compensation blocks 252 are needed only for p≥2.

The horizontal arrow, which depicts the distance PB between two adjacent radiator groups 110, indicates that this is approximately equal to the wavelength inside the waveguide $\lambda g$ (despite the phase compensation blocks 252). $\lambda g$ is always greater than the wavelength in air $\lambda o$, since the fundamental TE-mode inside the waveguide has a non-zero cut-off frequency. For near to bore-sight radiation and reception, the excitation of successive adjustable power taps 251 needs to be in-phase, which relates to actually ca. 360° phase shift along the interstage connection. FIG. 8 demonstrates that serially fed 1D-arrays of traverse slots can be constructed, where the central feed points of the ridged waveguide 150 feed lines are spaced ca. $\lambda g$ apart, but grating lobes can still be mitigated. This is, because the radiator groups 110 cover the combined antenna aperture "seamlessly".

The features of the various embodiments can be combined with each other to enable a number of different implementations. As stated before, all embodiments at least comprise a structured metal layer 112, a structured layer 113, and a waveguide 150. If a single ridged waveguide 150.s is employed as part of an embodiment, then the open conduit of this waveguide 150.s might be covered by a cover lid 154.

It further goes without saying, that (other than depicted in FIG. 5A) also different embodiments of apparatus 100 can be combined (eventually in large numbers, in various locations and orientations parallel to the x-y plane) into one apparatus 300. This is especially convenient, if these embodiments share the same layer composition (structured metal layer 112, 112.1, 112.2 and structured layer 113). This degree of freedom can be used to support a vast number of different applications, having a plentitude of different transmit- and receive characteristics, including combinations of different wave polarizations, e.g. for advanced polarimetric radar sensors.

While the above describes certain embodiments, those skilled in the art should understand that the foregoing description is not intended to limit the spirit or scope of the present disclosure. It should also be understood that the embodiments of the present disclosure described herein are merely exemplary and that a person skilled in the art may make any variations and modification without departing from the spirit and scope of the disclosure. All such variations and modifications, including those discussed above, are intended to be included within the scope of the disclosure.

The invention claimed is:

1. An apparatus for radiating and/or receiving microwaves and comprising at least one radiator group with u building blocks with u being an even number, with u≥2, wherein
   said at least one radiator group has a sandwich-layout comprising a structured layer with q integrated cavities on one side face, with q being an integer number≥2, and a structured metal layer covering at least part of said one side face,
   said u building blocks are structurally identical,
   said structured metal layer is structured so that each of said u building blocks comprises a suspended patch-shaped element, which is cavity-backed by one of said q integrated cavities,
   the shape and size of said suspended patch-shaped elements is defined by boundary slots of said metal layer, a distinction being made between outer boundary slots and inner boundary slots,
   said at least one radiator group at least comprises q=2 integrated cavities, two outer boundary slots and two inner boundary slots,
   said at least one radiator group has a common, central feed point defined by a central metal base and serving as an interface for a hollow waveguide or a waveguide flange connected to said central feed point.

2. The apparatus of claim 1, wherein each of said suspended patch-shaped elements is laterally surrounded by an outer boundary slot and an inner boundary slot, and wherein each of said suspended patch-shaped elements is suspended by two opposite suspension arms.

3. The apparatus of claim 1, wherein each of said boundary slots comprises at least one U-shaped portion.

4. The apparatus of claim 1, wherein said radiator group comprises u=2 building blocks, with an even number of n patch-shaped elements, with n=2, and m plus k boundary slots, where m is an even number and k is an even number, and where m=2 and k=2.

5. The apparatus of claim 1, wherein said radiator group comprises u=2 building blocks, n=4 patch-shaped elements, and m=4 plus k=4 boundary slots.

6. The apparatus of claim 1, wherein said radiator group comprises u=2 building blocks, n=4 patch-shaped elements, and m=4 plus k=2 boundary slots.

7. The apparatus of claim 6, wherein
two boundary slots of said m=4 boundary slots plus k=2 boundary slots are situated close to a first axis of symmetry and are mirrored with respect to said first axis of symmetry, and
each of the other four boundary slots of said m=4 boundary slots plus k=2 boundary slots is situated at an outer edge of one of the n=4 patch-shaped elements, and is mirrored with respect to said first axis of symmetry.

8. The apparatus according to claim 1, wherein said structured metal layer is structured so that it comprises the central metal base serving as the central feed point for said hollow waveguide or for said waveguide flange.

9. The apparatus according to claim 1, comprising a hollow waveguide having a longitudinal axis extending perpendicularly with respect to a plane defined by said one side face.

10. The apparatus according to claim 1, comprising a hollow waveguide having a longitudinal axis extending parallel with respect to a plane defined by said one side face.

11. A radar apparatus comprising an apparatus according to claim 1 with two times v radiator groups, where v is an integer number.

12. The radar apparatus according to claim 11 further comprising two times v−1 power taps and/or two times v−1 phase compensation blocks.

13. The radar apparatus according to claim 11 being part of an automotive radar system.

* * * * *